US010343589B2

(12) United States Patent
Gordon et al.

(10) Patent No.: US 10,343,589 B2
(45) Date of Patent: *Jul. 9, 2019

(54) DRONE-ENHANCED VEHICLE EXTERNAL LIGHTS

(71) Applicant: International Business Machines Corporation, Armonk, NY (US)

(72) Inventors: Michael S. Gordon, Yorktown Heights, NY (US); James Robert Kozloski, New Fairfield, CT (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/994,473

(22) Filed: May 31, 2018

(65) Prior Publication Data
US 2018/0272919 A1 Sep. 27, 2018

Related U.S. Application Data

(63) Continuation of application No. 15/223,358, filed on Jul. 29, 2016, now Pat. No. 9,987,971.

(51) Int. Cl.
*B60Q 1/00* (2006.01)
*B60Q 1/44* (2006.01)
(Continued)

(52) U.S. Cl.
CPC ............ *B60Q 1/0017* (2013.01); *B60Q 1/04* (2013.01); *B60Q 1/34* (2013.01); *B60Q 1/44* (2013.01);
(Continued)

(58) Field of Classification Search
CPC .......... B60Q 1/0017; B60Q 5/00; B60Q 1/34; B60Q 1/44; B60Q 1/04; B62D 63/02;
(Continued)

(56) References Cited

U.S. PATENT DOCUMENTS

| 4,757,481 A | 7/1988 | Orr et al. |
| 5,521,817 A | 5/1996 | Burdoin et al. |

(Continued)

FOREIGN PATENT DOCUMENTS

| AU | 2014100500 A4 | 6/2014 |
| CN | 1648962 A | 8/2005 |

(Continued)

OTHER PUBLICATIONS

Garling, "Drone, Drone on the Range," Modern Farmer, Jul. 8, 2013, 4 pages, http://modernfarmer.com/2013/07/drones-drones-on-the-range/.

(Continued)

*Primary Examiner* — Anne M Antonucci
(74) *Attorney, Agent, or Firm* — Amin, Turocy & Watson, LLP

(57) ABSTRACT

Techniques for drone device control are provided. In one example, the technique includes monitoring, by a drone device operatively coupled to a processor and allocated to a vehicle in operation, one or more conditions associated with the vehicle. The technique also includes, in response to identifying, by the drone device, a defined condition of the one or more conditions: moving, by the drone device, to a position relative to the vehicle and determined based on the defined condition; and performing, by the drone device, an indication operation determined based on the defined condition.

20 Claims, 17 Drawing Sheets

(51) Int. Cl.
*B60Q 1/04* (2006.01)
*B62D 63/02* (2006.01)
*B63G 8/00* (2006.01)
*B60Q 1/34* (2006.01)
*B64C 39/02* (2006.01)
*B60Q 5/00* (2006.01)

(52) U.S. Cl.
CPC ............... *B60Q 5/00* (2013.01); *B62D 63/02* (2013.01); *B64C 39/024* (2013.01); *B63G 2008/002* (2013.01); *B64C 2201/12* (2013.01)

(58) Field of Classification Search
CPC ............ B63G 8/001; B63G 2008/002; B64C 39/024; B64C 2201/12
See application file for complete search history.

(56) References Cited

U.S. PATENT DOCUMENTS

| | | | |
|---|---|---|---|
| 6,439,162 | B1 | 8/2002 | Van den Berg |
| 7,866,865 | B2 | 1/2011 | Wu |
| 8,229,604 | B2 | 7/2012 | Villaume et al. |
| 8,265,808 | B2 | 9/2012 | Garrec et al. |
| 8,314,695 | B2 | 11/2012 | Greenberg |
| 8,770,808 | B1 | 7/2014 | Campbell et al. |
| 8,880,241 | B2 | 11/2014 | Mohamadi |
| 8,913,783 | B2 | 12/2014 | Khan et al. |
| 9,057,609 | B2 | 6/2015 | Yu et al. |
| 9,170,117 | B1 | 10/2015 | Abuelsaad et al. |
| 9,651,945 | B1 | 5/2017 | Erickson et al. |
| 2005/0240323 | A1 | 10/2005 | Orita |
| 2006/0074557 | A1 | 4/2006 | Mulligan et al. |
| 2008/0099600 | A1 | 5/2008 | Perry et al. |
| 2010/0063650 | A1 | 3/2010 | Vian et al. |
| 2010/0180420 | A1 | 7/2010 | Radgens |
| 2011/0015816 | A1 | 1/2011 | Dow et al. |
| 2011/0208373 | A1 | 8/2011 | Lees et al. |
| 2011/0259995 | A1 | 10/2011 | Frings et al. |
| 2012/0044710 | A1 | 2/2012 | Jones |
| 2012/0081540 | A1 | 4/2012 | Jang |
| 2013/0100693 | A1 | 4/2013 | Rogers |
| 2013/0340305 | A1 | 12/2013 | Mobley |
| 2014/0249736 | A1 | 9/2014 | Beda et al. |
| 2014/0309853 | A1 | 10/2014 | Ricci |
| 2015/0127209 | A1 | 5/2015 | Al-Gami et al. |
| 2015/0251591 | A1 | 9/2015 | Lu |
| 2015/0353206 | A1 | 12/2015 | Wang |
| 2015/0370251 | A1 | 12/2015 | Siegel et al. |
| 2016/0070261 | A1 | 3/2016 | Heilman et al. |
| 2016/0071421 | A1 | 3/2016 | Bousquet et al. |
| 2016/0129999 | A1 | 5/2016 | Mays |
| 2016/0157414 | A1 | 6/2016 | Ackerman et al. |
| 2016/0264262 | A1 | 9/2016 | Colin et al. |
| 2016/0272317 | A1 | 9/2016 | Cho et al. |
| 2016/0378109 | A1 | 12/2016 | Raffa et al. |
| 2016/0378895 | A1 | 12/2016 | Gnecco et al. |
| 2017/0127652 | A1 | 5/2017 | Shen et al. |
| 2017/0154524 | A1 | 6/2017 | Beaulieu |
| 2017/0199520 | A1 | 7/2017 | Glatfelter |
| 2017/0202185 | A1 | 7/2017 | Trumbull et al. |
| 2018/0170540 | A1 | 6/2018 | Claybrough |

FOREIGN PATENT DOCUMENTS

| | | |
|---|---|---|
| CN | 103782914 A | 5/2014 |
| CN | 203689138 U | 7/2014 |
| CN | 104156821 A | 11/2014 |
| CN | 204095648 U | 1/2015 |
| CN | 105248308 A | 1/2016 |
| DE | 19900333 A1 | 7/2000 |
| FR | 3007176 A1 | 12/2014 |
| JP | 08083394 A | 3/1996 |
| KR | 1020150100589 A | 9/2015 |
| WO | 2010/057266 A1 | 5/2010 |
| WO | 2014/080388 A2 | 5/2014 |
| WO | 2015/068864 A1 | 5/2015 |
| WO | 2015/188831 A1 | 12/2015 |
| WO | 2015187172 A1 | 12/2015 |
| WO | 2017153912 A1 | 9/2017 |

OTHER PUBLICATIONS

Hudson, "Drone technology makes mustering easy in North otago", Nov. 9, 2015, 2 pages, http://www.stuff.co.nz/business/farming/agribusiness/73454308/Drone-technology-makes-mustering-easy-in-North-otago.

Lenkaitis, "Livestock flight zone research lays groundwork for drone use", Progressive Dairyman, Sep. 11, 2015, 5 pages, http://www.progressivedairy.com/topics/bams-equipmentllivestock-ftight-zone-research-lays-groundwork-for-drone-use.for-drone-use.

Follow Me Vehicle Procedure, Retrieved from https://www.skybrary.aero/index.php/Follow_Me_Vehicle_Procedures, Retrieved on Apr. 16, 2018, 5 pages.

List of IBM Patents or Applications Treated as Related, 2 pages.

Non-Final office action received for U.S. Appl. No. 15/223,358, dated Sep. 12, 2017, 24 pages.

Rear position lamps (tail lamps),"Automotive Lighting," Last edited Jun. 7, 2016, https://en.wikipedia.org/wiki/Automotive_lighting#Rear_position_lamps .28tail_lamps.29, 1 page.

Kanistras, et al., "Survey of Unmanned Aerial Vehicles (UAVs) for Traffic Monitoring", Handbook of Unmanned Aerial Vehicles, 2015, pp. 2643-2666.

Jackson, et al., "Airborne Technology for Distributed Air Traffic Management," Proceedings of the 44th IEEE Conference on Decision and Control, and the European Control Conference, 2005, pp. 3947-3954.

Non-Final office action received for U.S. Appl. No. 14/930,806, dated Nov. 10, 2016, 13 pages.

Notice of Allowance received for U.S. Appl. No. 14/930,806, dated Jan. 18, 2017, 24 pages.

Mel et al. "The NIST Definition of Cloud Computing". Recommendations of the National Institute of Standards and Technology, Nov. 16, 2015, 7 pages.

Non-Final Office Action for U.S. Appl. No. 15/418,826 dated May 2, 2018, 12 pages.

Non-Final Office Action for U.S. Appl. No. 15/220,166 dated Apr. 20, 2018, 265 pages.

Humphrey, Laura R., "Model checking for Verification in UAV Cooperative Control Applications", Recent Advances in Research on Unmanned Aerial Vehicles, 2013, pp. 69-117.

Morris et al., "Self-Driving Aircraft Towing Vehicles—A Preliminary Report", Artificial Intelligence for Transportation: Advice, Interactivity and Actor Modeling: Papers from the 2015 AAAI Workshop, 2015, pp. 41-48.

Non-Final office action received for U.S. Appl. No. 15/223,351, dated May 31, 2018, 46 pages.

Final Office Action for U.S. Appl. No. 15/418,826 dated Jun. 29, 2018, 9 pages.

Non-Final Office Action for U.S. Appl. No. 15/994,468 dated Nov. 2, 2018, 28 pages.

Non-Final Office Action for U.S. Appl. No. 15/994,478 dated Nov. 16, 2018, 32 pages.

Notice of Allowance received for U.S. Appl. No. 15/220,166, dated Sep. 21, 2018, 27 pages.

Final office action received for U.S. Appl. No. 15/223,351, dated Nov. 28, 2018, 46 pages.

List of IBM Patents or Applications Treated as Related.

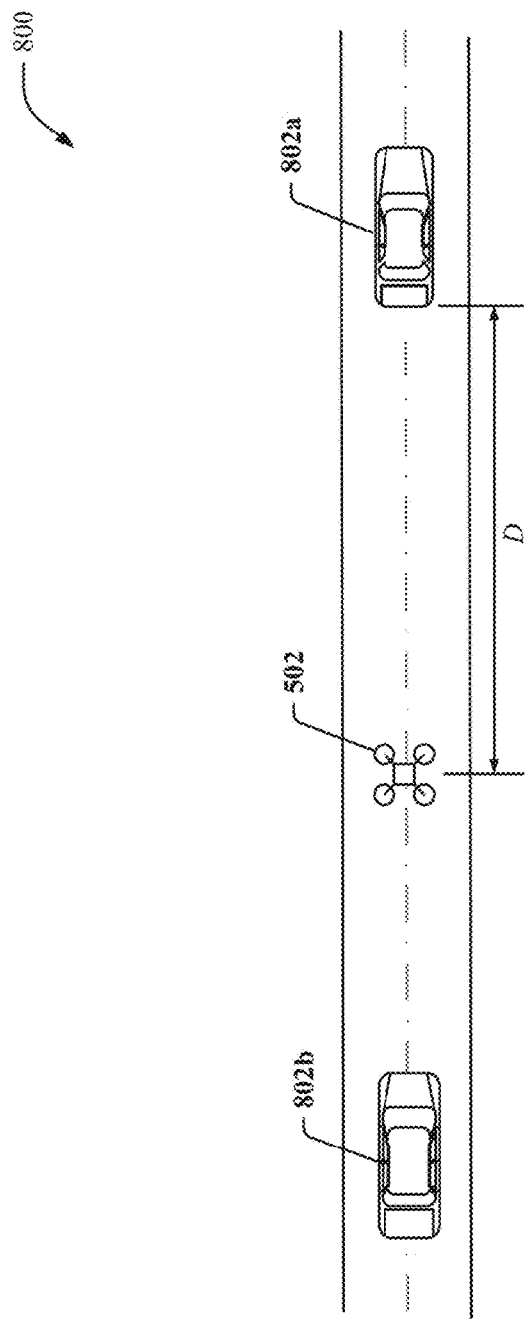

DRONE-ENHANCED VEHICLE EXTERNAL LIGHTS

BACKGROUND

The subject disclosure relates to employing one or more drones to perform a vehicle external light function.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate employing one or more drones to perform a vehicle external light function are described.

According to an embodiment, a computer-implemented method can comprise monitoring, by a drone device operatively coupled to a processor and allocated to a vehicle in operation, one or more conditions associated with the vehicle. The computer-implemented method can further comprise, in response to identifying, by the drone device, a defined condition of the one or more conditions moving, by the drone device, to a position relative to the vehicle and determined based on the defined condition, and performing, by the drone device, an indication operation determined based on the defined condition.

According to another embodiment, a drone device is provided. The drone device can comprise a memory that stores computer executable components; and a processor that executes the computer executable components stored in the memory. The computer executable components can comprise a monitoring component that determines a defined region around a vehicle and monitors the defined region for one or more conditions. The computer executable components can also comprises a response component that causes the drone device to perform one or more actions to mitigate a condition in response to detection of the condition.

According to yet another embodiment, a computer program product for augmenting a malfunctioning operation of an external light of a vehicle in operation is provided. The computer program product can comprise a computer readable storage medium having program instructions embodied therewith. The program instructions can be executable by a drone device to cause the drone device to identify the malfunctioning operation of the external light of the vehicle in operation. The program instructions can also be executable by the drone device move to a defined position relative to the external light of the vehicle in operation. The program instructions can also be executable by the drone device to perform an action to substitute a normal light operation for the malfunctioning operation of the external light.

DESCRIPTION OF THE DRAWINGS

FIG. 8 illustrates a block diagram of a non-limiting example drone device response environment in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however in various cases, that the one or more embodiments can be practiced without these specific details.

In adverse weather conditions a vehicle following another vehicle may not be able to clearly see the signal lights of the other vehicle without following the other vehicle at an unsafe distance for the adverse weather conditions. Furthermore, a signal light for a vehicle may have stopped operating properly, and thus not provide proper indications to other vehicles. Additionally, a vehicle headlight may have stopped operating properly causing poor lighting of the road ahead of the vehicle. This can lead to dangerous conditions for the operator of the vehicle or other nearby vehicles, which can possibly result in a vehicle accident. For example, if a vehicle is following another vehicle at an unsafe condition for the adverse weather conditions, the vehicle may collide with the rear of the other vehicle if the other vehicle brakes quickly. In another example, if a vehicle headlight is not operating properly, an operator of the vehicle may not see an obstruction in the road and a vehicle accident can occur.

Figure 1:
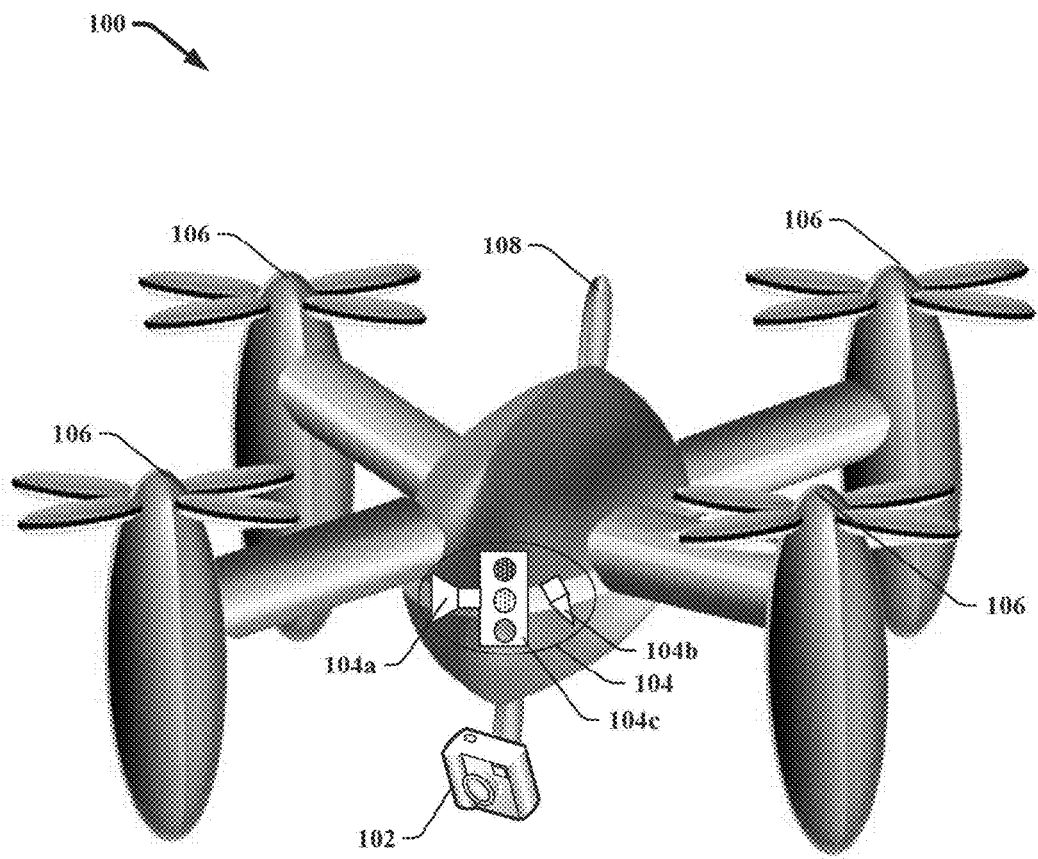
FIG. 1 illustrates a block diagram of an example, non-limiting aerial drone device in accordance with one or more embodiments described herein.

FIGS. 1, 2, 3 and 4 illustrate block diagrams of example, non-limiting drone devices in accordance with one or more embodiments described herein. FIG. 1 illustrates a block diagram of an example, non-limiting aerial drone device 100 in accordance with one or more embodiments described herein. Repetitive description of like elements employed in other embodiments described herein is omitted for sake of brevity.

One or more embodiments described herein can facilitate efficiently, effectively, and automatically (e.g., with little or no direct human involvement) employing drone devices (e.g., drone device 100) to deploy near a vehicle to substitute for or augment a vehicle light. For example, in various embodiments, one or more drone devices (e.g., drone device 100) can position themselves relative to a vehicle to substitute for or augment one or more lights of the vehicle. Although the term "drone device" is used herein, in various embodiments, the examples provided can include one or more drone devices operating independently or in a distributed fashion, as applicable. All such embodiments are envisaged. The one or more drone devices (e.g., drone device 100) can monitor a vehicle, determine a defined condition under which one or more drone devices (e.g., drone device 100) will substitute for or augment one or more lights of the vehicle, and/or position the one or more drone devices (e.g., drone device 100) relative to the vehicle to substitute for or augment the one or more lights of the vehicle, and/or take any other suitable action in response to determination of the defined condition.

In order to facilitate substituting for or augmenting one or more lights of a vehicle, one or more drone devices (e.g., drone device 100) described herein can be employed and can communicate with one other, communicate with another device, communicate with a control system, communicate with a vehicle, communicate with an operator of the vehicle, communicate with emergency service personnel, and/or communicate with any other suitable equipment and/or personnel.

One or more drone devices can coordinate amongst themselves to make decisions regarding actions to be taken by drone devices. Drone devices can receive instructions from another device, such as a control system, regarding actions to be taken by the drone devices. Drone devices can receive instructions from an operator, such as a vehicle driver, emergency personnel, control system personnel, and/or any other suitable personnel, regarding actions to be taken by the drone devices. A drone device (e.g., drone device 100) can autonomously make decisions regarding actions to be taken by the drone device. It is to be appreciated that drone devices can employ any of the aforementioned decision making methods, alone or in combination, regarding actions to be taken by the drone devices.

A drone device can be, in a non-limiting example, an aerial drone device, a submersible drone device, a terrestrial drone device, a mobile robotic device (e.g., humanoid shaped, animal shaped, and/or any other suitable shape), or any combination thereof. A drone device can include a propulsion system appropriate for the environments in which the drone device will operate, non-limiting examples of which include one or more propellers, one or more wings, one or more motors, one or more jet engines, one or more thrusters, one or more fins, one or more wheels, one or more continuous tracks, one or more buoyancy systems, one or more transmissions, one or more drivetrains, one or more rudders, one or more trims, one or more a tails, one or more arms, one or more legs, one or more springs, one or more steering assemblies, and/or any other suitable propulsion components or systems.

A drone device can include a power source, non-limiting examples of which include one or more batteries, one or more fuel cells, natural gas, compressed air, diesel fuel, gasoline, oil, propane, nuclear power system, solar power system, piezoelectric power system, and/or any other suitable power source. A drone device can include, but are not limited to, one or more computers, one or more processors, one or more memories, and one or more programs. A drone device can communicate via any suitable form of wireless or wired communication using a communication device. Non-limiting examples of wireless communication can include, but are not limited to, radio communication, optical communication, sonic communication, electromagnetic induction communication, and/or any other suitable wireless communication. A drone device can include one or more instruments, non-limiting examples of which include a communication device, a radio frequency identification (RFID) reader, navigation device, a sensor, a camera, a video camera, a three-dimensional camera, a global positioning system (GPS) device, a motion sensor, a radar device, a temperature sensor, a light sensor, a thermal imaging device, an infrared camera, an audio sensor, an ultrasound imaging device, a light detection and ranging (LIDAR) sensor, sound navigation and ranging (SONAR) device, a microwave sensor, a chemical sensor, a radiation sensor, an electromagnetic field sensor, a pressure sensor, a spectrum analyzer, a scent sensor, a moisture sensor, a biohazard sensor, a gyroscope, an altimeter, a microscope, magnetometer, a device capable is seeing through or inside of objects, and/or any other suitable instruments. In addition, instruments can include tools, non-limiting examples of which include, a projectile launcher, a liquid sprayer, an air blower, a flame thrower, a heat projector, a cold projector, a scent projector, a chemical projector, an electric discharge device, a grasping device, a moveable and/or articulating arm, a hand, object manipulation devices, a fire extinguisher, a screwdriver, a hammer, a wrench, a welder, a saw, a knife, a pick, a prod, a vacuum device, a suction device, a sander, a laser, and/or any suitable tools to perform any task. Additionally, instruments can include, but are not limited to, one or more indicator devices, non-limiting examples of which can include, but are not limited to, a light, a signal light, a light pattern, a display screen, an audio speaker, and/or any other suitable indicator device.

A drone device can be constructed out of any suitable material appropriate for environments in which the drone device will operate. A drone device can have suitable protection against an environment in which the drone device will operate, non-limiting examples of which include weather resistant, crush resistant, fire resistant, heat resistant, cold resistant, pressure resistant, impact resistant, liquid and/or solid material ingress protection, chemical resistant, corrosion resistant, shatter resistant, scratch resistant, bio-contamination resistant, electromagnetic pulse resistant, electrical shock resistant, projectile resistant, explosion resistant, and/or any other suitable resistance for an environment in which the drone device will operate.

As shown in FIG. 1, drone device 100 can include instrument 102, which in this example shows a camera; however any suitable instrument as disclosed herein can be included in or coupled to drone device 100. Drone device 100 can also include instrument 104, which in this example shows a left indicator 104a, a right indicator 104b, and a stop/caution/go light indicator 104c; however any suitable indicator device as disclosed herein can be included in or coupled to drone device 100.

As shown, drone device 100 can include four propellers 106 in a quadcopter configuration; however drone device 100 can include any suitable number of propellers 106 or any other suitable propulsion system. Drone device 100 can also include communication device 108. Drone device 100 can include other suitable components (not shown), such as those disclosed herein, and/or any other suitable components that can be implemented in a drone device.

Figure 2:
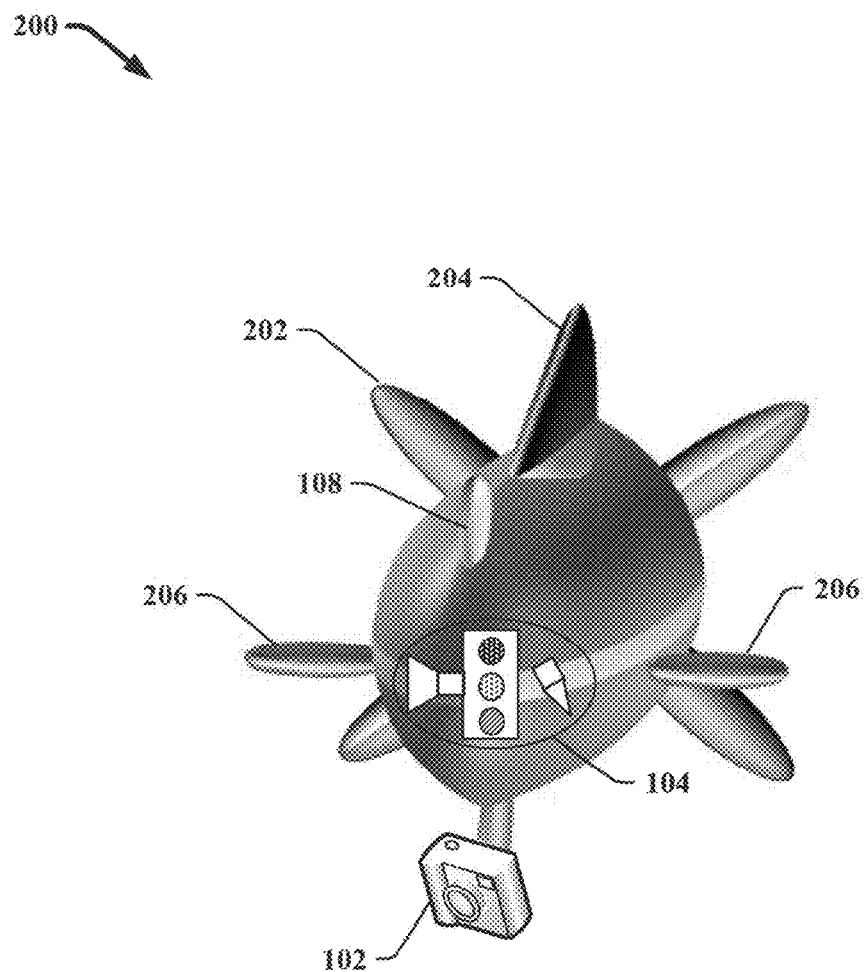
FIG. 2 illustrates a block diagram of an example, non-limiting submersible drone device in accordance with one or more embodiments described herein.

FIG. 2 illustrates a block diagram of an example, non-limiting submersible drone device 200 in accordance with one or more embodiments described herein. Repetitive description of like elements employed in other embodiments described herein is omitted for sake of brevity.

Drone device 200 can include instrument 102, which in this example shows a camera; however any suitable instrument as disclosed herein can be included in or coupled to drone device 200. Drone device 200 can also include instrument 104; however any suitable indicator devices as disclosed herein can be included in or coupled to drone device 200. Drone device 200 can include a propeller 202, rudder 204, and fins 206; however drone device 200 can include any suitable number of propellers 202, rudders 204, fins 206, and/or any other suitable propulsion system. Drone device 200 can also include communication device 108. Drone device 200 can include other suitable components (not shown), such as those disclosed herein, and/or any other suitable components that can be implemented in a drone device.

Figure 3:
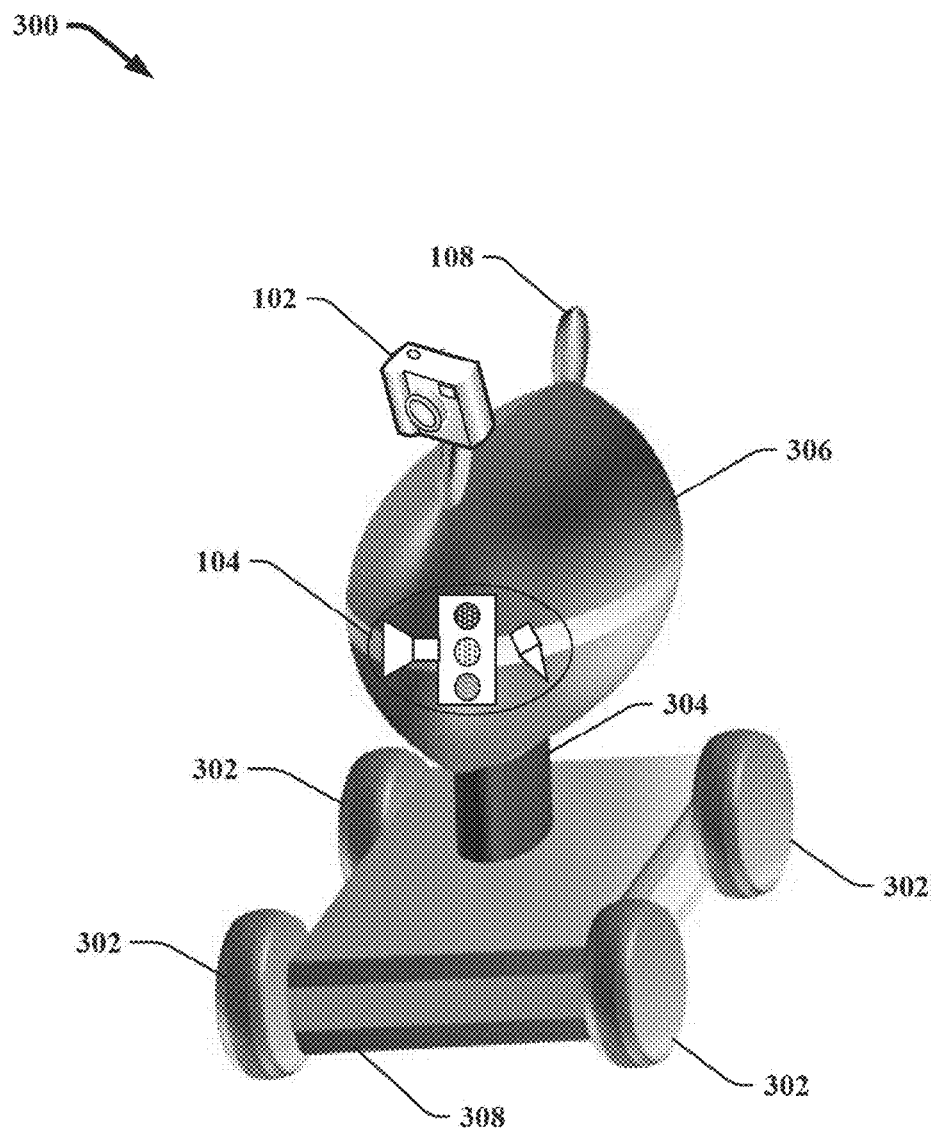
FIG. 3 illustrates a block diagram of an example, non-limiting terrestrial drone device in accordance with one or more embodiments described herein.

FIG. 3 illustrates a block diagram of an example, non-limiting terrestrial drone device 300 in accordance with one or more embodiments described herein. Repetitive description of like elements employed in other embodiments described herein is omitted for sake of brevity.

Drone device 300 can include instrument 102, which in this example shows a camera; however any suitable instrument as disclosed herein can be included in or coupled to drone device 300. Drone device 300 can also include instrument 104; however any suitable indicator devices as disclosed herein can be included in or coupled to drone device 300. While instrument 102 and instrument 104 are depicted as located on upper portion 306 of drone device 300, instrument 102 and instrument 104 can be located on lower portion 308 of drone device 300, and/or on both upper portion 306 and lower portion 308 of drone device 300. Drone device 300 can include four wheels 302; however drone device 300 can include any suitable number of wheels 302, and/or any other suitable propulsion system. Drone device 300 can also include communication device 108. Drone device 300 can also include a rotatable/extendable arm 304 that allows for instrument 102 and instrument 104 on upper portion 306 of drone device 300 to be positioned at any selected height and/or angle. Drone device 300 can include other suitable components (not shown), such as those disclosed herein, and/or any other suitable components that can be implemented in a drone device.

Figure 4:
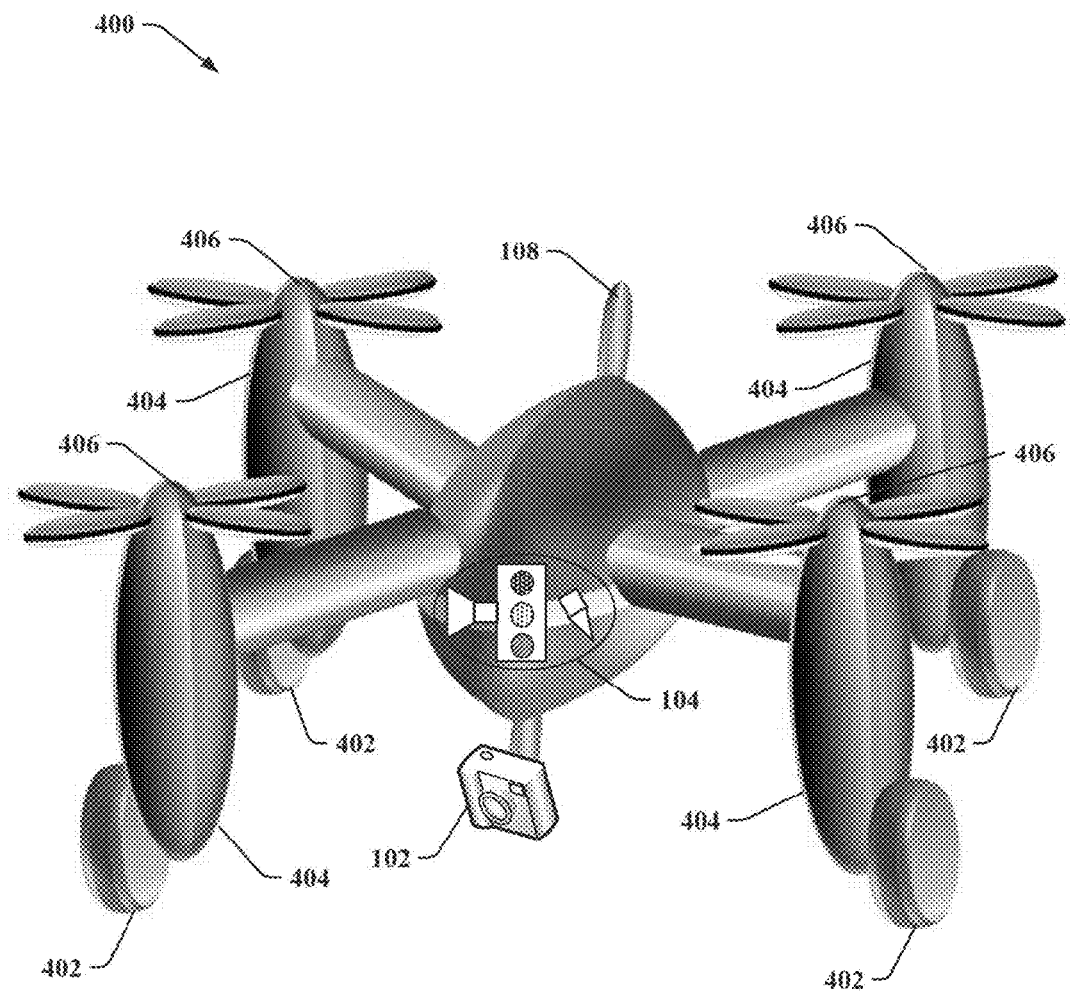
FIG. 4 illustrates a block diagram of an example, non-limiting combination aerial, submersible, and terrestrial drone device in accordance with one or more embodiments described herein.

FIG. 4 illustrates a block diagram of an example, non-limiting combination aerial, submersible, and terrestrial drone device 400 in accordance with one or more embodiments described herein. Drone device 400 can include instrument 102, which in this example shows a camera; however any suitable instrument as disclosed herein can be included in or coupled to drone device 400. Drone device 400 can also include instrument 104; however any suitable indicator devices as disclosed herein can be included in drone device 400. Drone device 400 can include four propellers 406 in a quadcopter configuration; however drone device 400 can include any suitable number of propellers 106 or any other suitable propulsion system for aerial propulsion. Drone device 400 can include four wheels 402; however drone device 400 can include any suitable number of wheels 402, and/or any other suitable propulsion system for terrestrial propulsion. Drone device 400 can also include rotatable or movable arms 404 that allow propellers 406 to be positioned for propulsion during submersion of drone device 400; however drone device 400 can include any other suitable propulsion system for submersible propulsion. Drone device 400 can also include communication device 108. Drone device 400 can include other suitable components (not shown), such as those disclosed herein, and/or any other suitable components that can be implemented in a drone device.

The computer processing systems, computer-implemented methods, apparatus and/or computer program products employ hardware and/or software to solve problems that are highly technical in nature (e.g., related to automated drone devices deploying near a vehicle to substitute for or augment a vehicle light), that are not abstract and that cannot be performed as a set of mental acts by a human. One or more embodiments of the subject computer processing systems, methods, apparatuses and/or computer program products enable one or more drone devices to coordinate amongst themselves, and optionally with other devices, to perform actions to monitor a vehicle (which can be performed in real-time some embodiments), determine a defined condition under which one or more drone devices are needed to substitute for or augment one or more lights of the vehicle, position the one or more drone devices relative to the vehicle to substitute for or augment the one or more lights of the vehicle, perform one or more actions by the one or more drone devices 502, 524 to substitute for or augment the one or more lights of the vehicle 518, and/or take any other suitable action in response to determination of the defined condition.

While examples herein refer to an automobile for illustrative purposes, it is to be appreciated that the concepts disclosed herein can be employed for any type of vehicle (e.g., terrestrial, aerial, submersible, and/or combination thereof) for which one or more drone devices can perform actions to monitor a vehicle, determine a defined condition under which one or more drone devices are needed to substitute for or augment one or more lights of the vehicle, and position the one or more devices relative to the vehicle to substitute for or augment the one or more lights of the vehicle, and/or take any other suitable action in response to determination of the defined condition. Non-limiting examples of vehicles can include, but are not limited to, an automobile, a truck, a bus, a motorcycle, a scooter, a roadside assistance vehicle, an emergency vehicle, a police vehicle, an ambulance, a fire engine vehicle, a garbage truck, a limousine, a motor home, a van, a pickup vehicle, a snowplow, a recreational vehicle, a streetcar, a vehicle with a trailer, a trolley, a bicycle, a snowmobile, an all-terrain vehicle, a train, a boat, a ship, a yacht, a sailboat, a hydrofoil, a non-commercial watercraft, an airboat, a submarine, an airplane, a helicopter, a commercial aircraft, a military aircraft, a non-commercial aircraft, and/or any other suitable vehicle. For example, an emergency vehicle can employ a drone device to substitute for or augment an emergency light. In another example, boats in inland waterways can employ drone devices to substitute for or augment a boat light. In another example, a police car can deploy a drone device ahead of the police vehicle in an emergency to provide advanced signaling that the police vehicle is approaching. In a further example, a train can deploy a drone device ahead of the train near an approaching railroad crossing to provide advanced signaling that the train is approaching. It is to be appreciated the drone devices disclose herein can be employed by any suitable type of vehicle, to substitute for or augment any suitable light of the vehicle, under any suitable defined condition.

Furthermore, while examples herein refer to one or more drone devices removably coupled to (e.g., attached, connected, located on, mounted, docked, anchored, fastened, embedded in, etc.) a vehicle, it is to be appreciated that drone devices can be located at various locations along a vehicle travel path that can deployed to assist passing vehicles as needed. For example, a known segment of road that is prone to foggy conditions can have one or more base locations having drones that can be deployed to passing vehicles that are entering the segment of road when fog is present. In another example, a segment of road that does not have street lights can have one or more base locations having drones that can be deployed to passing vehicles that are entering the segment of road between poor light conditions (e.g., at night, between dusk and dawn, during cloudy conditions when little moonlight is present, and/or any other suitable poor light conditions). In a further example, a segment of road that has a steep decline can have one or more base locations having drones that can be deployed to passing vehicles that are entering such segment of road to maintain greater distance between vehicles that are traversing the steep decline.

Figure 5:
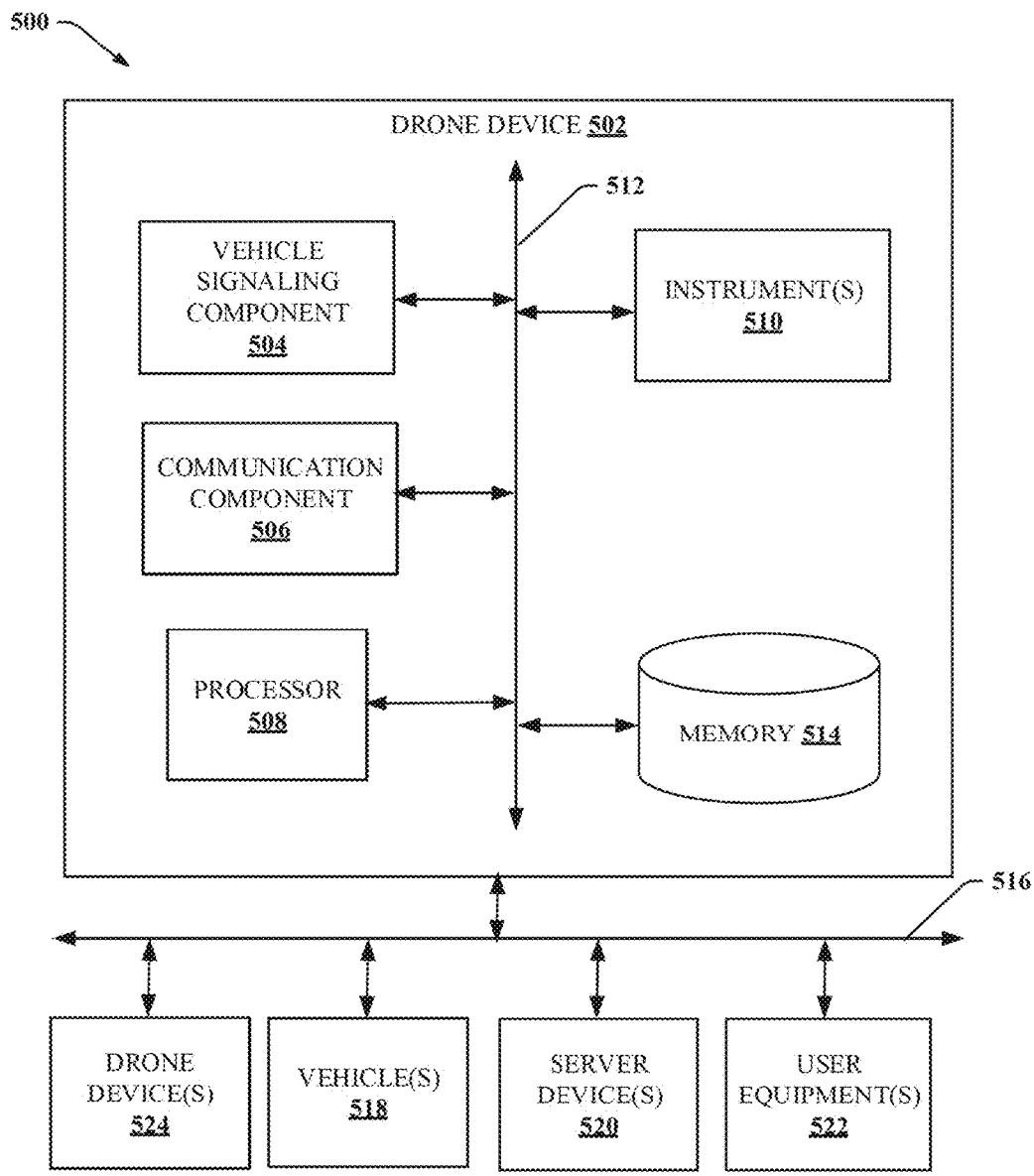
FIG. 5 illustrates a block diagram of an example, non-limiting system that facilitates drone devices substituting for or augmenting a vehicle light in accordance with one or more embodiments described herein.

FIG. 5 illustrates a block diagram of an example, non-limiting system 500 that facilitates drone devices substituting for or augmenting a vehicle light in accordance with one or more embodiments described herein. Repetitive description of like elements employed in other embodiments described herein is omitted for sake of brevity. Aspects of systems (e.g., system 500 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 5, the system 500 can include one or more drone devices 502, 524, one or more networks 516, one or more vehicles 518, one or more server devices 520, and one or more user equipment 522. Drone devices 502, 524 can include the structure and/or functionality of one or more of drone device 100, 200, 300, 400 and/or any other structure and/or functionality described herein for drone devices. Drone device 524 can be a different type of drone device than drone device 502. Drone device 524 can also be a drone device 502 and/or include one or more components of drone device 502. It is to be appreciated that in discussions below where more than one drone device is employed, the drone devices can include one or more drone device 502 and/or one or more drone device 524.

Figure 7:
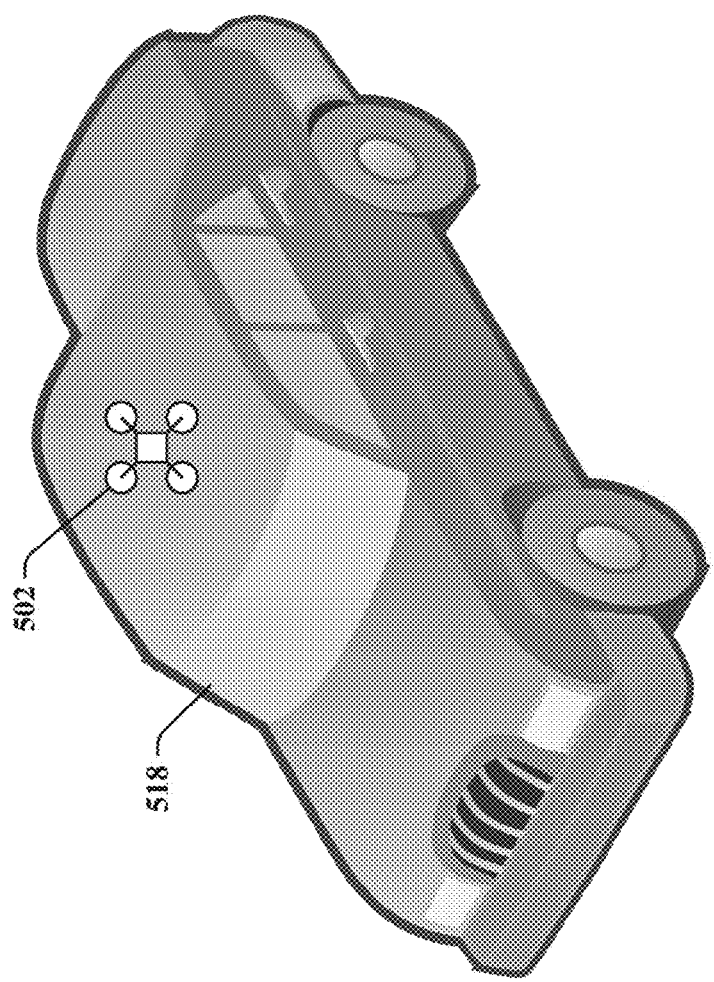
FIG. 7 illustrates a block diagram of a non-limiting example vehicle having a removably coupled drone device in accordance with one or more embodiments described herein.

FIG. 7 illustrates a block diagram of a non-limiting example vehicle 518 having a removably coupled drone device 502 in accordance with one or more embodiments described herein. With reference to FIGS. 5 and 7, drone device 502 can be removably coupled to vehicle 518. For example, drone device 502 can be docked at a docking port (not shown) on vehicle 518 from which drone device 502 can de-couple and re-couple. Drone device 502 can receive power from vehicle 518 for example, from an electric charging port (not shown), a fuel supply line (not shown), and/or any other suitable power supply from a vehicle 518. In some embodiments, drone device 502 can be produce its own power, for example, from a solar panel, a wind power generator, a piezoelectric generator, a nuclear reaction, a fuel cell, and/or any other suitable power generating source.

In some embodiments, drone device 502 can include instruments 510, which can be instruments as discussed herein. Drone device 502 can include communication component 506 that enables drone device 502 to communicate with other drone devices 524, vehicles 518, server devices 520, and user equipment 522 over one or more networks 516 via wireless and/or wired communications. Drone device 502 can include vehicle signaling component 504 that can enable drone device 502 to perform actions to monitor one or more vehicles 518, determine a defined condition under which the drone device 502 are needed to substitute for or augment one or more lights of a vehicle 518, position the drone device 502, 524 relative to the vehicle 518 to substitute for or augment the one or more lights of the vehicle, perform one or more actions by the one or more drone devices 502, 524 to substitute for or augment the one or more lights of the vehicle 518, and/or take any other suitable action in response to determination of the defined condition.

As shown in FIG. 7, in this example, drone device 502 is coupled to a roof of vehicle 518. However, drone device 502 can be coupled to any portion of vehicle 518. Referring back to FIG. 5, drone device 502 can include or otherwise be associated with at least one memory 514 that can store computer executable components (e.g., computer executable components can include, but are not limited to, the vehicle signaling component 504, communication component 506, and associated components). Drone device 502 can also include or otherwise be associated with at least one processor 508 that executes the computer executable components stored in the memory 514. Drone device 502 can further include a system bus 512 that can couple the various components including, but not limited to, vehicle signaling component 504, communication component 506, instruments 510, memory 514, processor 508, another drone device (e.g., drone device 524) and/or other components.

While a drone device 502 is shown in FIG. 5 to include vehicle signaling component 504, in other embodiments, any number of different types of devices can be associated with or include all or some of the components of vehicle signaling component 504. For example, vehicle 518, server device 520 and/or user equipment 522 can include all or some of the components of vehicle signaling component 504. All such embodiments are envisaged.

Vehicle 518 can include any vehicle as disclosed herein. Server device 520 can be any computing device that can be communicatively coupled to drone device 502, non-limiting example of which can include a server computer, a computer, a mobile computer, a control system, a collision avoidance system, a weather computer, an emergency system, a communication system, a warning system, a radar system, a traffic system, and/or any other suitable computing device. User equipment 522 can be any device employed by a user, non-limiting examples of which include a vehicle, safety equipment, a communication device, a server device, and/or any other suitable device that can be employed by a user. It is to be appreciated that user equipment 522 can be equipped with a communication device that enable a user and/or the user equipment 522 to communicate with drone device 502 over network 516. Furthermore, drone devices 502, 524, vehicle 518, server device 520, and user equipment 522 can be equipped with communication devices that enable communication between drone devices 502, 524, vehicles 518, server devices 520, and user equipment 522 over one or more networks 516.

The various components (e.g., vehicle signaling component 504, communication component 506, instruments 510, memory 514, processor 508, drone devices 502, 524, vehicles 518, server devices 520, user equipment 522, and/or other components) of system 500 can be connected either directly or via one or more networks 516. Such networks 516 can include wired and wireless networks, including, but not limited to, a cellular network, a wide area network (WAN) (e.g., the Internet), and/or a local area network (LAN), non-limiting examples of which include cellular, WAN, wireless fidelity (Wi-Fi), Wi-Max, WLAN, radio communication, microwave communication, satellite communication, optical communication, sonic communication, electromagnetic induction communication, and/or any other suitable communication technology.

Figure 6:
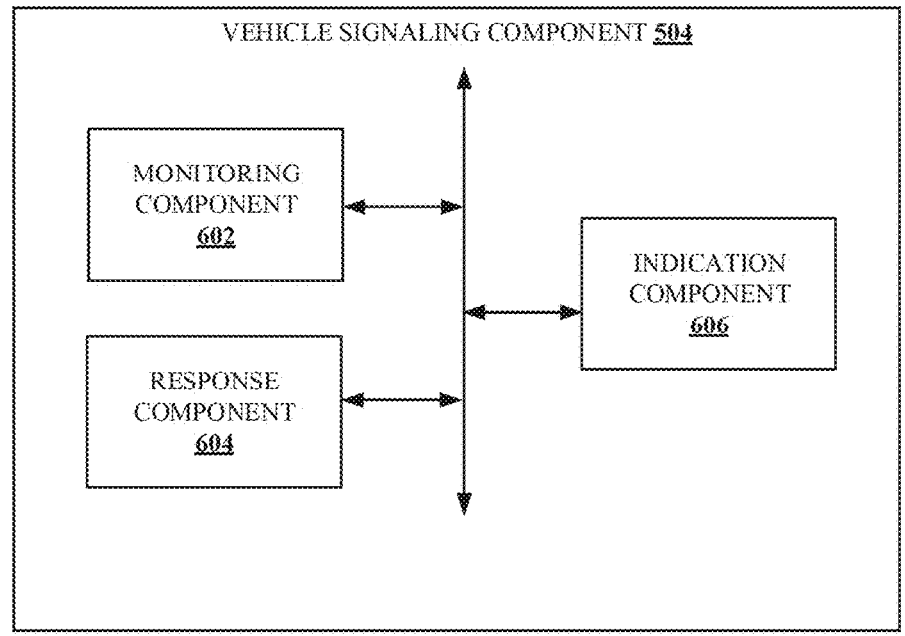
FIG. 6 illustrates a block diagram of an example, non-limiting vehicle signaling component that facilitates drone devices substituting for or augmenting a vehicle light in accordance with one or more embodiments described herein.

FIG. 6 illustrates a block diagram of an example, non-limiting vehicle signaling component 504 that facilitates drone devices (e.g., drone device 502, 524) substituting for or augmenting a vehicle light in accordance with one or more embodiments described herein. Repetitive description of like elements employed in other embodiments described herein is omitted for sake of brevity.

In one or more embodiments, the vehicle signaling component 504 can enable drone device 502 to perform actions to monitor one or more vehicles 518, determine a defined condition under which a drone device 502 is needed to substitute for or augment one or more lights of a vehicle 518, position the drone device 502 relative to the vehicle 518 to substitute for or augment the one or more lights of the vehicle, perform one or more actions by the drone device 502 to substitute for or augment the one or more lights of the vehicle 518, and/or take any other suitable action in response to determination of the defined condition in accordance with one or more embodiments described herein.

Vehicle signaling component 504 can include monitoring component 602 that can monitor one or more vehicles (e.g., vehicle 518) using instruments 510 and determine a defined condition under which drone device 502 is needed to substitute for or augment one or more lights of a vehicle 518. Vehicle signaling component 504 can also include response component 604 that can position the drone device 502 relative to the vehicle 518 to substitute for or augment the one or more lights of the vehicle 518 and perform one or more actions by the drone device 502 to substitute for or augment the one or more lights of the vehicle 518 in response to determination of the defined condition. Vehicle signaling component 504 can also include indication component 606 that can operate an instrument(s) 510 based upon a determined action to be taken by drone device 502.

Monitoring component 602 can define a region around vehicle 518 or receive information from another drone device 502 or server device 520 defining a region around vehicle 518 for monitoring of defined conditions. The defined region can be a two dimensional or three dimensional zone around all or one or more other portions of vehicle 518. The defined region can be determined based upon information associated with current and/or previous defined regions of vehicles 518, known defined conditions associated with vehicles 518, drone device 502 information, vehicle 518 information (e.g., year, make, model, specifications, maintenance history, current maintenance state, current faults, load, and/or any other suitable information associated with a vehicle), weather information, road condition information, traffic information, vehicle operator information (e.g., operator demographics, operator licensure, current operator cogitative state, operator driving history, operator driving violation history, and/or any other suitable information associated with an operator of a vehicle), mapping information, and/or any other suitable information that can be employed by monitoring component 602 to determine a defined condition under which the drone device 502 is needed to substitute for or augment one or more lights of a vehicle 518 based upon any suitable monitoring criteria.

Furthermore, monitoring component 602 can adjust a defined region around vehicle 518 while vehicle 518 is stationary or in motion based upon real-time information associated with current and/or previous defined regions of vehicles 518, known defined conditions associated with vehicles 518, drone device 502 information, vehicle 518 information (e.g., year, make, model, specifications, maintenance history, current maintenance state, current faults, load, and/or any other suitable information associated with a vehicle), weather information, road condition information, traffic information, vehicle operator information (e.g., operator demographics, operator licensure, current operator cogitative state, operator driving history, operator driving violation history, and/or any other suitable information associated with an operator of a vehicle), mapping information, and/or any other suitable information that can be employed by monitoring component 602 to determine a defined condition under which the drone device 502 is needed to substitute for or augment one or more lights of a vehicle 518.

In a non-limiting example, monitoring component 602 can employ a utility analysis based on determined respective risks associated with defined conditions to make adjustments to a defined region around vehicle 518 as vehicle 518 encounters respective defined conditions.

Monitoring component 602 can continuously, randomly, or periodically initiate monitoring all or a portion of the defined region around vehicle 518 for defined conditions. Monitoring component 602 can initiate monitoring for defined conditions based upon defined criteria, operator specified criteria, dynamically determined criteria, vehicle operator instruction, instruction from vehicle 518, instruction from server device 520, instruction from user equipment 522. For example, vehicle 518 can detect a fault and instruct drone device 502 to initiate monitoring for defined conditions. In another example, an operator of vehicle 518 can instruct drone device 502 to initiate monitoring for defined conditions. In a further example, drone device 502 can continuously monitor vehicle 518. In an additional example, drone device 502 can initiate monitoring for defined conditions at specified time intervals, or based upon real-time information (e.g., a weather report, an accident report, and/or any other suitable real-time information). Monitoring component 602 can employ any suitable criteria for initiating monitoring for defined conditions.

In an example, monitoring component 602 can move one or more drone devices 502, 524 to one or more other positions relative to vehicle 518 to inspect vehicle 518, an area inside vehicle 518, the defined region around vehicle 518, and/or an area outside of the defined region for defined conditions. Monitoring component 602 can employ instruments 510 to monitor vehicle 518, an area inside vehicle 518, the defined region around vehicle 518, and/or an area outside of the defined region for defined conditions under which one or more drone devices 502 are needed to substitute for or augment one or more lights of a vehicle 518. Indication component 606 can provide an indication (e.g., visual indication, audio indication, electronic message, and/or any other suitable indication) to a recipient (e.g., operator of vehicle 518, a server device 520, a user equipment 522, operator of another vehicle 518, and/or any other suitable recipient) indicating that drone device 502 is conducting an inspection of vehicle 518, an area inside vehicle 518, the defined region around vehicle 518, and/or an area outside of the defined region for defined conditions.

In another example, vehicle 518 can include monitoring component 602 and monitor vehicle 518, an area inside vehicle 518, the defined region around vehicle 518, and/or an area outside of the defined region for defined conditions. Vehicle 518 can inform drone device 502 of any determined defined conditions. In another example, server device 520 and/or user equipment 522 can include monitoring component 602 and inspect vehicle 518, an area inside vehicle 518, the defined region around vehicle 518, and/or an area outside of the defined region for defined conditions. Server device 520 and/or user equipment 522 can inform drone device 502 of any determined defined conditions. For example, drone device 502 can remain docked at vehicle 518 or at a roadside location, thereby conserving power and/or fuel, and be deployed once drone device 502 received information regarding any determined defined conditions from monitoring component 602, vehicle 518, server device 520, and/or user equipment 522 indicating a need for drone device 502 to substitute for or augment one or more lights of a vehicle 518.

In a non-limiting example, a defined condition can include any suitable defined condition under which one or more drone devices 502 are needed to substitute for or augment one or more lights of a vehicle 518. For example, a defined condition can include a weather condition (e.g., rain, snow, fog, ice, wind, flooding, sand storm, dust storm, and/or any other suitable weather condition) that could cause poor vehicle operator visibility, slippery road condition, increased vehicle stopping distance, unexpected vehicle movement (e.g., vehicle lane change, vehicle swerving, vehicle braking, vehicle turning, vehicle sliding, vehicle speed change, and/or any other suitable unexpected vehicle movement), and/or any other suitable unsafe vehicle operating condition produced by a weather condition. In another example, a defined condition can include a vehicle 518 condition (e.g., a vehicle electronic system fault, a vehicle mechanical malfunction, an external indicator light malfunction, a headlight malfunction, a worn out brake, a flat tire, a cracked or broken window, anti-lock braking system activation, traction control system activation, airbag activation, a shift to low gear, vehicle reversing, activation of cruise control, lane departure warning, emergency brake assist system activation, collision avoidance system activation, and/or any other suitable vehicle condition) that could cause poor vehicle operator visibility, cause lack of external indication of vehicle operation to other vehicles, increased vehicle stopping distance, unexpected vehicle movement or any other suitable unsafe vehicle operating condition produced by vehicle 518 condition. In another example, a defined condition can include a vehicle 518 operator condition (e.g., unsafe vehicle operator cognitive state, a distracted vehicle operator, an intoxicated vehicle operator, a texting vehicle operator, a drowsy vehicle operator, a sleeping vehicle operator, an eating vehicle operator, a drinking vehicle operator, a talking vehicle operator, vehicle operator driving above an upper speed limit, vehicle operator driving erratically, vehicle operator driving below a lower speed limit, or any other suitable vehicle operator condition) that could cause poor vehicle operator visibility, cause lack of external indication of vehicle operation to other vehicles, increased vehicle stopping distance, unexpected vehicle movement, and/or any other suitable unsafe vehicle operating condition produced by vehicle 518 operator condition. In another example, a defined condition can include a road condition (e.g., icy road, wet road, flooded road, muddy road, rocky road, debris on road, object on road, animal on the road, animal approaching the road, road pothole, road narrowing, road widening, change in number of lanes in road, change in speed limit, bridge in road, bridge over road, steep road incline, steep road decline, winding road, hairpin turn, accident on road, emergency vehicle on road, change in road traffic, traffic jam, another vehicle within a defined distance behind the vehicle, cross traffic on the road, a fire, smoke, and/or any other suitable road condition) that could cause poor vehicle operator visibility, increased vehicle stopping distance, unexpected vehicle movement, and/or any other suitable unsafe vehicle operating condition. In another example, defined condition can relate to another vehicle 518 that is within a defined distance of vehicle 518. In another non-limiting example, defined conditions can include learned conditions, inferred conditions, predicted conditions, received information regarding defined conditions that can occur associated with vehicles 518, drone devices 502, objects, weather, roads, safety, defined region, and/or any other suitable items associated with a vehicle 518, and interaction therebetween.

Monitoring component 602 can monitor vehicle 518, an area inside vehicle 518, the defined region around vehicle 518, and/or an area outside of the defined region for any suitable defined condition under which one or more drone devices 502 are needed to substitute for or augment one or more lights of a vehicle 518. It is to be appreciated that the defined conditions can be predefined, operator specified, and/or dynamically determined, for example, based upon learning algorithms.

In a further example, monitoring component 602 can assign respective risk levels to defined conditions. Furthermore, monitoring component 602 can employ a utility analysis based on determined respective risks associated with defined conditions along with monitoring criteria to determine which defined conditions pose a risk to a vehicle 518 or object. In a non-limiting example, monitoring criteria can be a function based on one or more thresholds associated with risk levels of defined conditions.

It is to be appreciated that monitoring component 602 can employ artificial intelligence to make determinations related to defining regions and/or monitoring defined conditions using information associated with current and/or previous defined regions of vehicles 518, current and/or previous defined conditions associated with vehicles 518, drone device 502 information, vehicle 518 information (e.g., year, make, model, specifications, maintenance history, current maintenance state, current faults, load, and/or any other suitable information associated with a vehicle), weather information, road condition information, traffic information, vehicle operator information (e.g., operator demographics, operator licensure, current operator cogitative state, operator driving history, operator driving violation history, and/or any other suitable information associated with an operator of a vehicle), mapping information, and/or any other suitable information that can be employed by monitoring component 602 to determine a defined condition under which one or more drone devices 502 are needed to substitute for or augment one or more lights of a vehicle 518 based upon any suitable monitoring criteria. In addition, monitoring component 602 can employ learning algorithms using information associated with current and/or previous defined regions of vehicles 518, current and/or previous defined conditions associated with vehicles 518, drone device 502 information, vehicle 518 information (e.g., year, make, model, maintenance history, current maintenance state, current faults, load, and/or any other suitable information associated with a vehicle), weather information, road condition information, traffic information, vehicle operator information (e.g., operator demographics, operator licensure, current operator cogitative state, operator driving history, operator driving violation history, and/or any other suitable information associated with an operator of a vehicle), mapping information, and/or any other suitable information that can be employed by monitoring component 602 to determine a defined condition under which one or more drone devices 502 are needed to substitute for or augment one or more lights of a vehicle 518 based upon any suitable monitoring criteria. Monitoring component 602 can learn behaviors of vehicles 518, vehicle 518 operators, drone devices 502, weather conditions, road conditions, and/or objects to make determinations related to defining regions and/or monitoring defined conditions under which one or more drone devices 502 are needed to substitute for or augment one or more lights of a vehicle 518. It is to be appreciated that monitoring component 602 can employ any suitable information, any suitable monitoring criteria, and any suitable function make determinations related to defining regions and/or monitoring defined conditions under which one or more drone devices 502 are needed to substitute for or augment one or more lights of a vehicle 518.

It is to be appreciated that server devices 520 can include a monitoring component 602 and can provide information generated by monitoring component 602 to drone devices 502.

Response component 604 can determine one or more actions for one or more drone devices 502 to perform in response to determination of a defined condition by monitoring component 602. In a non-limiting example, response component 604 can determine an action for drone device 502 to perform to mitigate occurrence of a determined defined condition. For example, response component 604 can determine an action for drone device 502 to perform that prevents or reduces a probability that the determined defined condition will actually occur. In another non-limiting example, response component 604 can determine an action for drone device 502 to perform to mitigate an effect of a determined defined condition that has or will occur. For example, response component 604 can determine an action for drone device 502 to perform that reduces or prevents an effect if the determined defined condition actually occurs, non-limiting example of which can include vehicle 518, vehicle 518 occupant, and/or object damage, reducing cost, reducing human life loss, reducing human injury, reducing animal life loss, reducing animal injury, reducing security risk, reducing impact to traffic, reducing vehicle 518 downtime, and/or any other effect that can result from the determined defined condition occurring.

In an example, response component 604 can determine one or more action for one or more drone devices 502 to perform in response to determination of a defined condition, wherein the action includes providing an indication to one or more recipients, wherein the indication can include in a non-limiting example, an indication informing the one or more recipients of the defined condition or information related to the defined condition, an indication of an action the one or more recipients should perform related to mitigating the defined condition or an effects of the defined condition, an indication informing the one or more recipients of actions being performed by others related to mitigating the defined condition or an effect of the defined condition, and/or any other suitable indication related to the defined condition that can be provided to a recipient. Response component 604 can move drone device 502 to a location suitable for providing the indication to the one or more recipients. Response component 604 can instruct indication component 612 to provide an indication relating to the defined condition to the one or more recipients using one or more instruments 510. For example, response component 604 can move drone device 502 in a position visible to an operator of another vehicle at a position (e.g., behind, to the side of, in front of, and/or any other suitable position relative to vehicle 518) within a defined distance of vehicle 518, and indication component 606 can provide a visual indication relating to the defined condition using a visual indicator device (e.g., a light, a signal light, a light pattern, a display screen) to the operator of the other vehicle. In another example, response component 604 can move drone device 502 in a position audible to an operator of another vehicle at a position (e.g., behind, to the side of, in front of, and/or any other suitable position relative to vehicle 518) within a defined distance of vehicle 518, and indication component 606 can provide an audible indication relating to the defined condition using an audio indicator device (e.g., an audio speaker) to the operator of the other vehicle. In another example, indication component 606 can provide an electronic message transmission including an indication relating to the defined condition using a communication device to the recipient. In another example, indication component 606 can use a projectile launcher to launch a projectile as an indication relating to the defined condition to the recipient(s). In another example, response component 604 can cause drone device 502 to move in a pattern that provides an indication relating to the defined condition to the recipient.

FIG. 8 illustrates a block diagram of a non-limiting example drone device response environment 800 in accordance with one or more embodiments described herein. Repetitive description of like elements employed in other embodiments described herein is omitted for sake of brevity.

In one or more embodiments, the drone device response environment 800 can include drone device 502 deployed from vehicle 802a in response to a defined condition in accordance with one or more embodiments described herein. Response component 604 has deployed drone device 502 behind vehicle 802a in response to monitoring component 602 having determined one or more defined conditions associated with a defined region around vehicle 802a that meets a monitoring criteria. For example, a defined condition of the one or more defined conditions can be another vehicle 802b behind vehicle 802a. Response component 604 can determine a distance D behind vehicle 802a that drone device 502 should be positioned based on distance criteria, non-limiting examples of which can include vehicle 802a and/or 802b information (e.g., year, make, model, specifications, maintenance history, current maintenance state, current faults, load, and/or any other suitable information associated with a vehicle), weather condition information, vehicle operator visibility, road condition information, traffic information, vehicle 802a and/or 802b operator information (e.g., operator demographics, operator licensure, current operator cogitative state, operator driving history, operator driving violation history, and/or any other suitable information associated with an operator of a vehicle), mapping information, and/or any other suitable information that can be employed by response component 604 to determine a distance D behind vehicle 802a that drone device 502 should be positioned. For example, response component 604 can analyze specification of vehicle 802a to determine braking capabilities of vehicle 802a along with determining road condition information to determine a first braking distance for vehicle 802a at its current speed and vehicle condition, analyze specification of vehicle 802b to determine braking capabilities of vehicle 802b along with the determined road condition information to determine a second braking distance for vehicle 802b at its current speed and vehicle condition. Response component 604 can determine distance D based upon the first braking distance for vehicle 802a, the second braking distance for vehicle 802b, and/or a buffer distance amount. Response component 604 can increase or decrease distance D as information changes associated with the first braking distance for vehicle 802a and/or the second braking distance for vehicle 802b. Indication component 606 can provide indications (e.g., visual, audio, electronic, pattern of movement, and/or any other suitable indication using instruments 510) to vehicle 802b related to operation of vehicle 802a. In another example, response component 604 can adjust distance D based on a determined level of visibility of an operator of vehicle 802b of a region ahead of vehicle 802b. For example, as a determined level of visibility of the operator of vehicle 802b of the region ahead of vehicle 802b decreases, response component 604 can increase distance D, and as the determined level of visibility of the operator of vehicle 802b of the region ahead of vehicle 802b increases, response component 604 can decrease distance D. In a further example, if a defined condition of the one or more defined conditions is related to poor visibility, indication component 606 can adjust a hue, intensity, and/or pattern of light produced by an indicator light to setting determined to provide a defined level of visibility to an operator of a vehicle 518. For example, the intensity of light can be increased to a setting to provide a defined level of visibility to an operator of a vehicle 518. In another example, a hue or shade of the light can be set to provide defined level of visibility to an operator of a vehicle 518 under foggy condition.

FIGS. 9A-9H illustrate block diagrams of non-limiting example drone devices outputting visual indications in accordance with one or more embodiments described herein. Repetitive description of like elements employed in other embodiments described herein is omitted for sake of brevity.

Figure 9A:
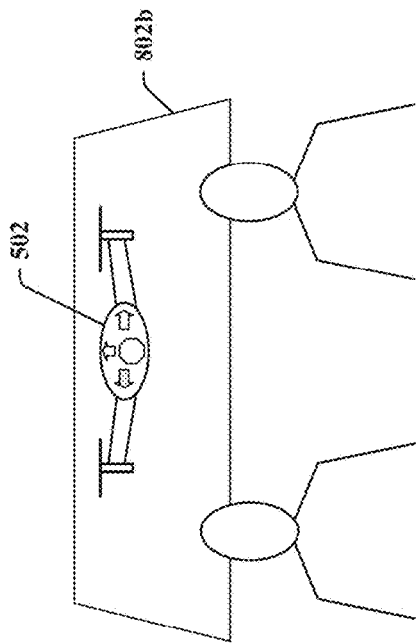
FIGS. 9A-9H illustrate block diagrams of non-limiting example drone devices outputting visual indications in accordance with one or more embodiments described herein.
Figure 9B:
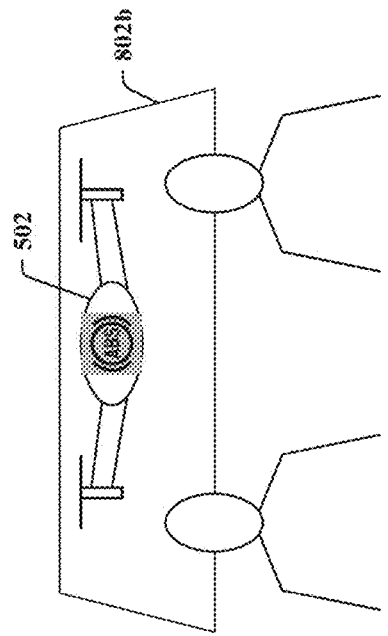
Figure 9C:
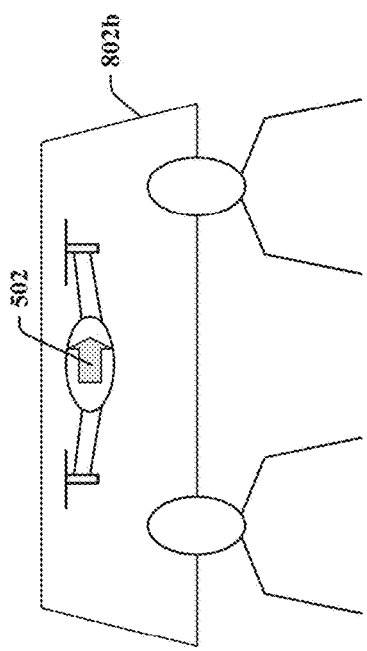
Figure 9D:
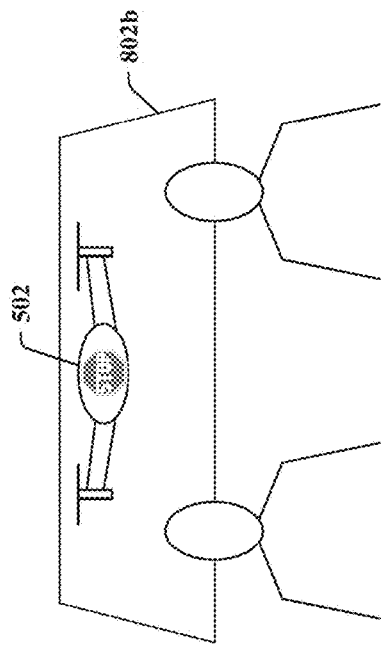
Figure 9E:
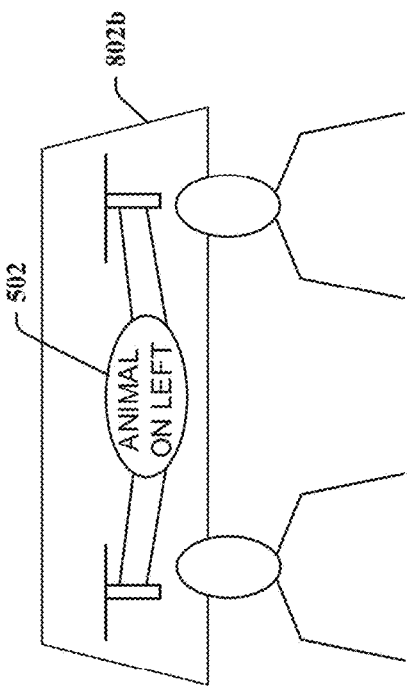
Figure 9F:
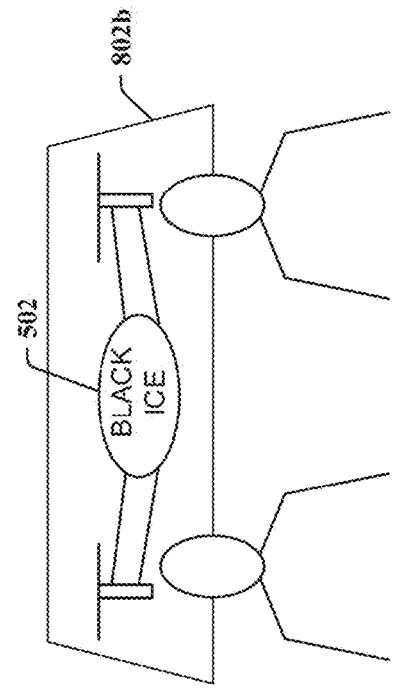
Figure 9G:
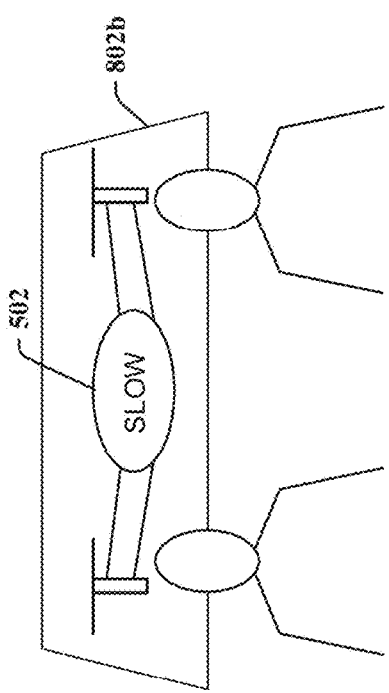
Figure 9H:
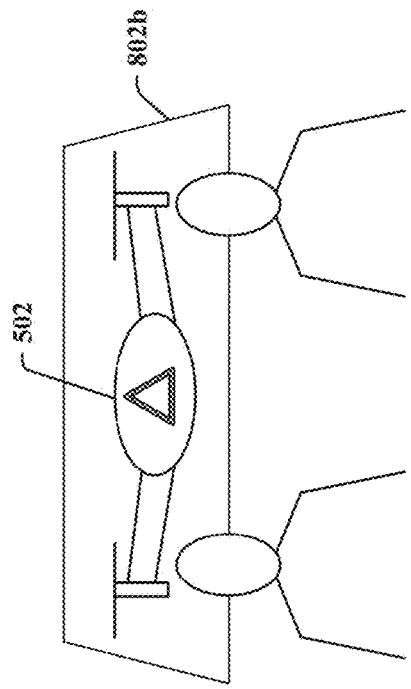

As shown, in FIGS. 9A-9H illustrated are block diagrams of non-limiting example drone devices providing visual indications to an operator of vehicle 802b from the viewpoint of the operator of vehicle 802b. FIG. 9A illustrates drone device 502 with a display device displaying a right turn arrow to indicate that vehicle 802a is intending to turn right. FIG. 9B illustrates drone device 502 with an indicator panel with fixed indicators for left turn arrow, forward arrow, right turn arrow, and stop, where the left turn arrow is lit up to indicate that vehicle 802a is intending to turn left. FIG. 9C illustrates drone device 502 with a display device displaying a stop sign to indicate that vehicle 802a is braking and/or stopping. FIG. 9D illustrates drone device 502 with a display device displaying anti-lock braking system (ABS) symbol to indicate that the ABS system of vehicle 802a has been activated. FIG. 9E illustrates drone device 502 with a display device displaying the text "SLOW" to indicate that vehicle 802a is slowing its speed and/or that the operator of vehicle 802b should slow the speed of vehicle 802b. FIG. 8F illustrates drone device 502 with a display device displaying the text "ANIMAL ON LEFT" to indicate that there is an animal within the defined region of vehicle 802a to the left of vehicle 802a. It is to be appreciated the drone device 502 with a display device can display additional text or images to provide more information to the operator of vehicle 802b regarding the animal, such as an indication of type of animal, number of animals, and/or any other suitable information regarding the animals FIG. 9G illustrates drone device 502 with a display device displaying the international symbol for warning to indicate a warning to the operator of vehicle 802b and/or to indicate that the hazard light of vehicle 802a is activated. FIG. 9H illustrates drone device 502 with a display device displaying the text "BLACK ICE" to indicate that the road in the defined region has black ice on the road's surface. Indication component 606 can display any suitable text and/or images on a display device relating to the determined one or more determined defined conditions. It is to be appreciated that any suitable language can be employed by indication component 606 for displaying text, such as for example, based upon language of indication recipient.

Figure 10:
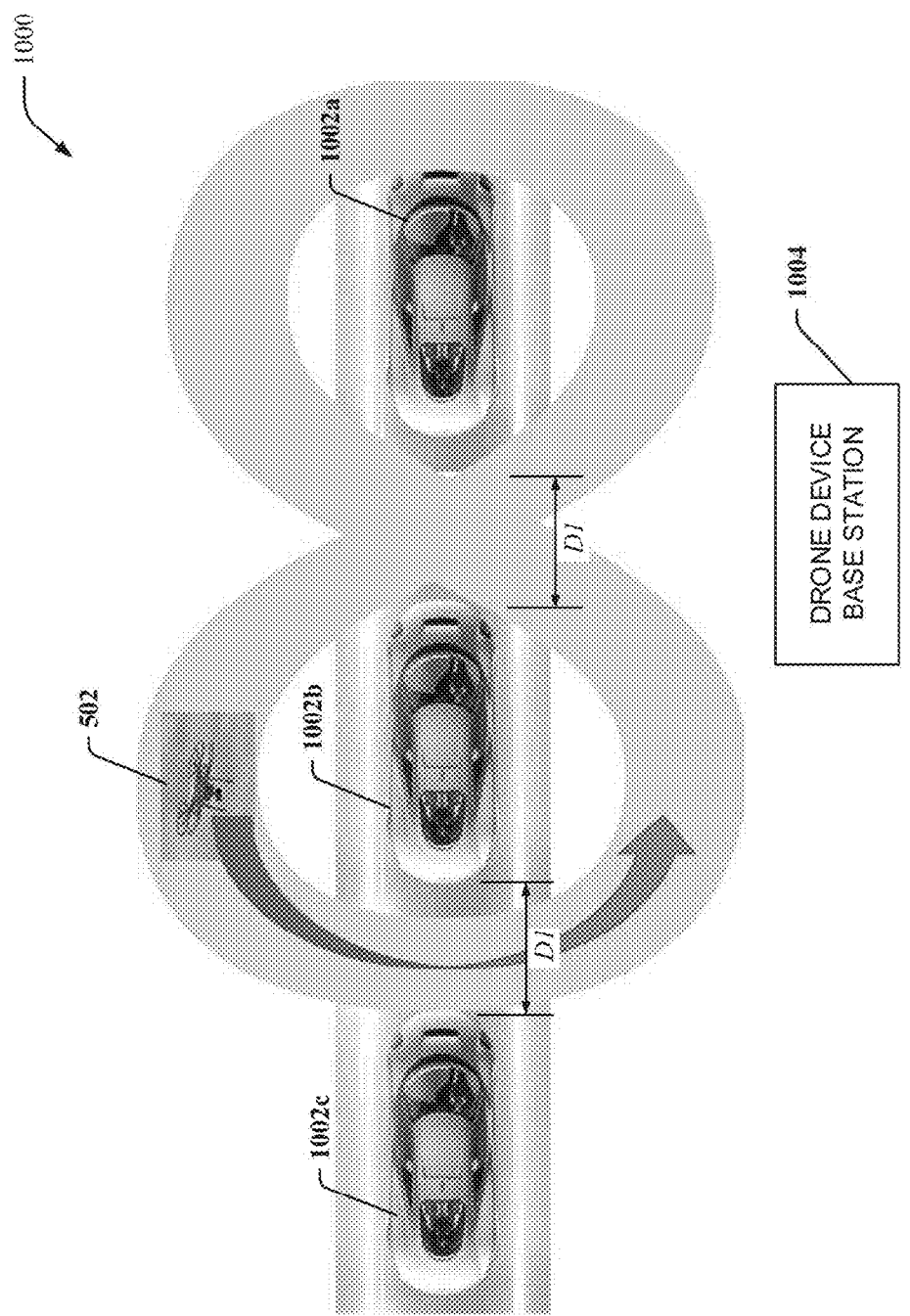
FIG. 10 illustrates a block diagram of a non-limiting example drone device response environment in accordance with one or more embodiments described herein.

FIG. 10 illustrates a block diagram of a non-limiting example drone device response environment 1000 in accordance with one or more embodiments described herein. Repetitive description of like elements employed in other embodiments described herein is omitted for sake of brevity.

In some embodiments, the drone device response environment 1000 can include a drone device 502 deployed from roadside drone device base station 1004 in response to a defined condition in accordance with one or more embodiments described herein. Response component 604 has deployed drone device 502 behind vehicle 802a in response to monitoring component 602 having determined one or more defined conditions associated with a defined region around vehicle 1002a that meets a monitoring criteria. Response component 604 can determine distances D1 and D2 to maintain between vehicles 1002a 1002b, 1002c respectively. Response component 604 can cause drone device 502 to move in a pattern as an indication to operators of vehicles 1002a 1002b, 1002c to maintain distances D1 and D2 to maintain between vehicles 1002a 1002b, 1002c respectively. In this example, the pattern movement for drone device 502 can be in a figure eight configuration around vehicles 1002*a* and 1002*b*. It is to be appreciated that any suitable pattern of movement or indication can be performed by drone device 502 an indication to operators of vehicles 1002*a* 1002*b*, 1002*c* to maintain distances D1 and D2 to maintain between vehicles 1002*a* 1002*b*, 1002*c* respectively.

In a further example, the defined condition can be an external light malfunctioning on a vehicle 518 and drone device 502 can move to a position relative to the malfunctioning external light on vehicle 518 such that drone device 502 can substitute for the malfunctioning external light and perform the normal functions of the external light.

Figure 11A:
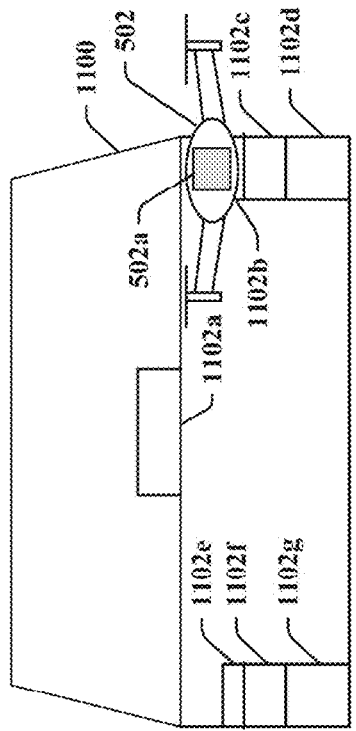
FIGS. 11A-11C illustrate block diagrams of non-limiting example drone devices substituting for a malfunctioning external light and performing the normal functions of the external light in accordance with one or more embodiments described herein.
Figure 11B:
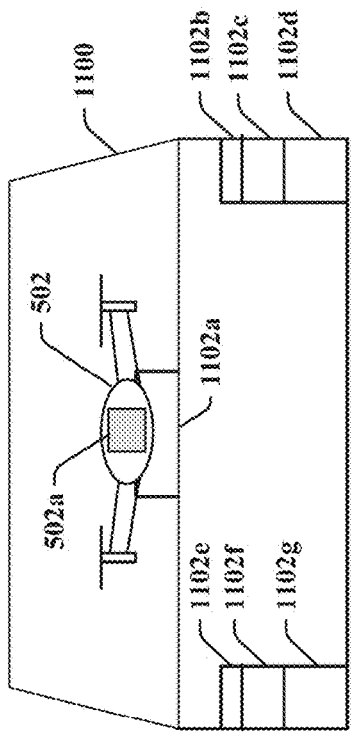
Figure 11C:
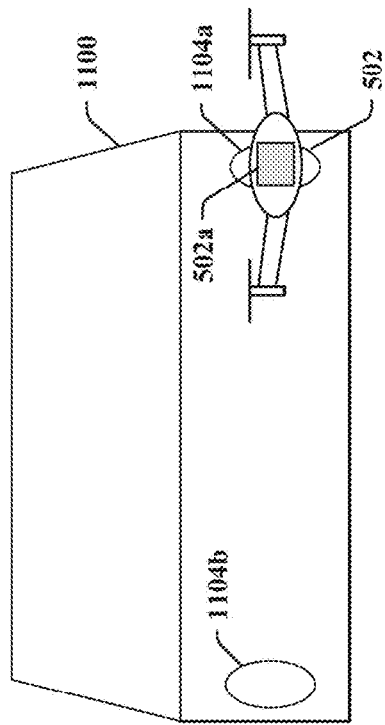

FIGS. 11A-11C illustrate block diagrams of non-limiting example drone devices substituting for a malfunctioning external light and performing the normal functions of the external light in accordance with one or more embodiments described herein. Repetitive description of like elements employed in other embodiments described herein is omitted for sake of brevity.

FIG. 11A illustrates drone device 502 positioning itself near and substituting for a center high mount stop lamp 1102*a* of vehicle 1100. Drone device 502 can include indicator device 502*a* that can perform all of the functions of center high mount stop lamp 1102*a*. For example, indicator device 502*a* can mimic the light hues, light intensities, light patterns, and/or any other suitable characteristic of center high mount stop lamp 1102*a*. Vehicle 1100 can also include rear right turn signal lamp 1102*b*, rear right stop lamp 1102*c*, rear right tail lamp 1102*d*, rear left turn signal lamp 1102*e*, rear left stop lamp 1102*f* and/or rear right tail lamp 1102*g*.

FIG. 11B illustrates drone device 502 positioning itself near and substituting for a rear right turn signal lamp 1102*b* of vehicle 1100. Drone device 502 can include indicator device 502*a* that can perform all of the functions of rear right turn signal lamp 1102*b*. For example, indicator device 502*a* can mimic the light hues, light intensities, light patterns, and/or any other suitable characteristic of rear right turn signal lamp 1102*b*.

FIG. 11*c* illustrates drone device 502 positioning itself near and substituting for front right headlamp assembly 1104*a* of vehicle 1100. Headlamp assembly 1104*a* can function as a headlight, a front left turn lamp, a daylight running lamp, and/or a fog lamp. Drone device 502 can include indicator device 502*a* that can perform all of the functions of rear front right headlamp assembly 1104*a*. For example, indicator device 502*a* can mimic the light hues, light intensities, light patterns, and/or any other suitable characteristic of front right headlamp assembly 1104*a* including the headlight, the front left turn lamp, the daylight running lamp, and the fog lamp.

It is to be appreciated that response component 604 can employ artificial intelligence to make determinations regarding actions to perform related to mitigating a defined condition or effects of a defined condition using information related to current and/or previous actions, current and/or previous defined conditions associated with vehicles 518, drone device 502 information, vehicle 518 information (e.g., year, make, model, specifications, maintenance history, current maintenance state, current faults, load, and/or any other suitable information associated with a vehicle), weather information, road condition information, traffic information, vehicle operator information (e.g., operator demographics, operator licensure, current operator cogitative state, operator driving history, operator driving violation history, and/or any other suitable information associated with an operator of a vehicle), mapping information, and/or any other suitable information along with any suitable mitigation criteria. In addition, response component 604 can employ learning algorithms using information relating to actions performed related to mitigating a defined condition or effects of a defined condition, current and/or previous actions, current and/or previous defined conditions associated with vehicles 518, drone device 502 information, vehicle 518 information (e.g., year, make, model, specifications, maintenance history, current maintenance state, current faults, load, and/or any other suitable information associated with a vehicle), weather information, road condition information, traffic information, vehicle operator information (e.g., operator demographics, operator licensure, current operator cogitative state, operator driving history, operator driving violation history, and/or any other suitable information associated with an operator of a vehicle), mapping information, and/or any other suitable information along with any suitable mitigation criteria.

Response component 604 can learn behaviors of vehicles 518, vehicle 518 operators, drone devices 502, weather conditions, road conditions, and/or objects for determining actions to perform related to mitigating a defined condition or effects of a defined condition. It is to be appreciated that response component 604 can employ any suitable information, any suitable mitigation criteria, and any suitable function for determining actions to perform related to mitigating a defined condition or effects of a defined condition. It is to be appreciated that server devices 520 can include response component 610 and can provide information to drone devices 502 regarding actions to perform related to mitigating a defined condition or effects of a defined condition.

While FIGS. 5 and 6 depict separate components in drone device 502, it is to be appreciated that two or more components can be implemented in a common component. Further, it is to be appreciated that the design of the drone device 502 can include other component selections, component placements, etc., to facilitate automated drone devices substituting for or augmenting a vehicle light. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to automated drone devices substituting for or augmenting a vehicle light. The subject computer processing systems, methods apparatuses and/or computer program products can be employed to solve new problems that arise through advancements in technology, computer networks, the Internet and the like. The subject computer processing systems, methods apparatuses and/or computer program products can provide technical improvements to systems for automated drone devices substituting for or augmenting a vehicle light by improving processing efficiency among processing components in these systems, reducing delay in processing performed by the processing components, and improving the accuracy in which the processing systems substitute for or augment a vehicle light.

It is to be appreciated that the any criteria (e.g., monitoring criteria, distance criteria, mitigation criteria, and/or any other suitable criteria) disclosed herein can be pre-defined, operator specified, and/or dynamically determined, for example, based upon learning algorithms.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect) described herein, components described herein can examine the entirety or a subset of the data to which it is granted access and can provide for reasoning about or determine states of the system, environment, etc. from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 12:
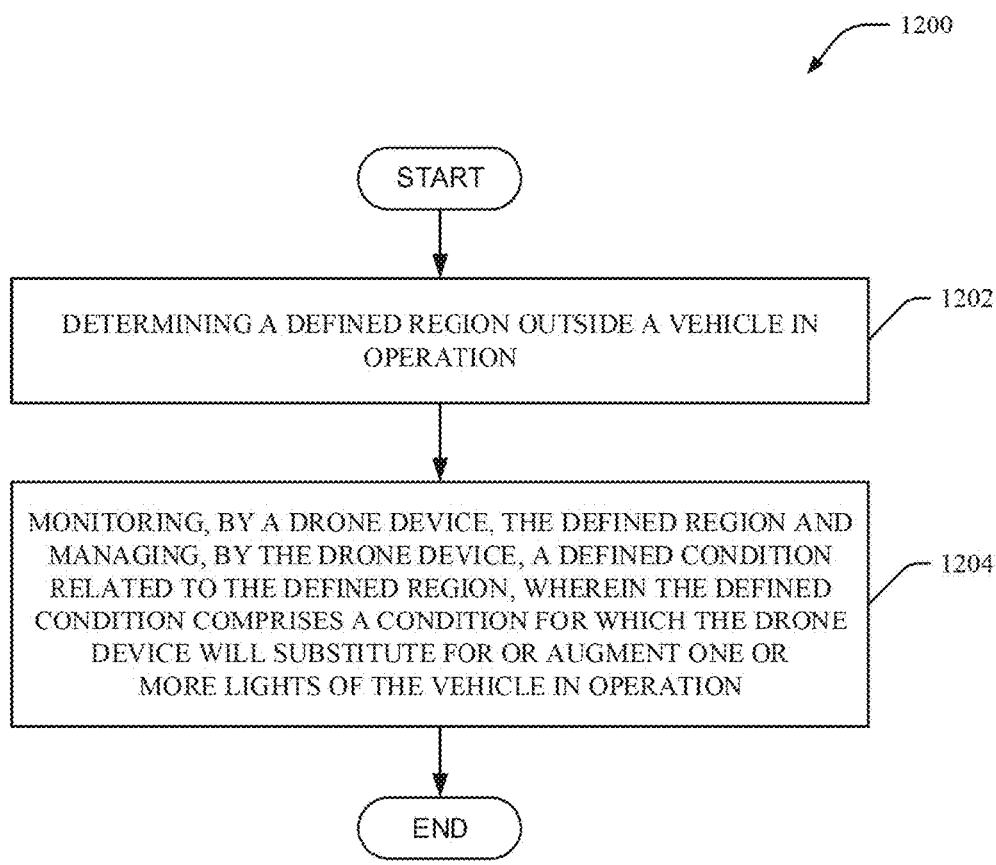
FIG. 12 illustrates a flow diagram of an example, non-limiting computer-implemented method that facilitates a drone device substituting for or augmenting a vehicle light in accordance with one or more embodiments described herein.

FIG. 12 illustrates a flow diagram of an example, non-limiting computer-implemented method 1200 that facilitates a drone device substituting for or augmenting a vehicle light in accordance with one or more embodiments described herein. Repetitive description of like elements employed in other embodiments described herein is omitted for sake of brevity.

At 1202, a region is defined outside of (or around) a vehicle in operation (e.g., via drone device 502, server device 520, a vehicle signaling component 504, and/or monitoring component 602). At 1204, the defined region is monitored and a defined condition related to the defined region under which the drone devices is needed to substitute for or augment one or more lights of the vehicle in operation is managed (e.g., via drone device 502, a vehicle signaling component 504, monitoring component 602, response component 604, and/or indication component 606).

Figure 13:
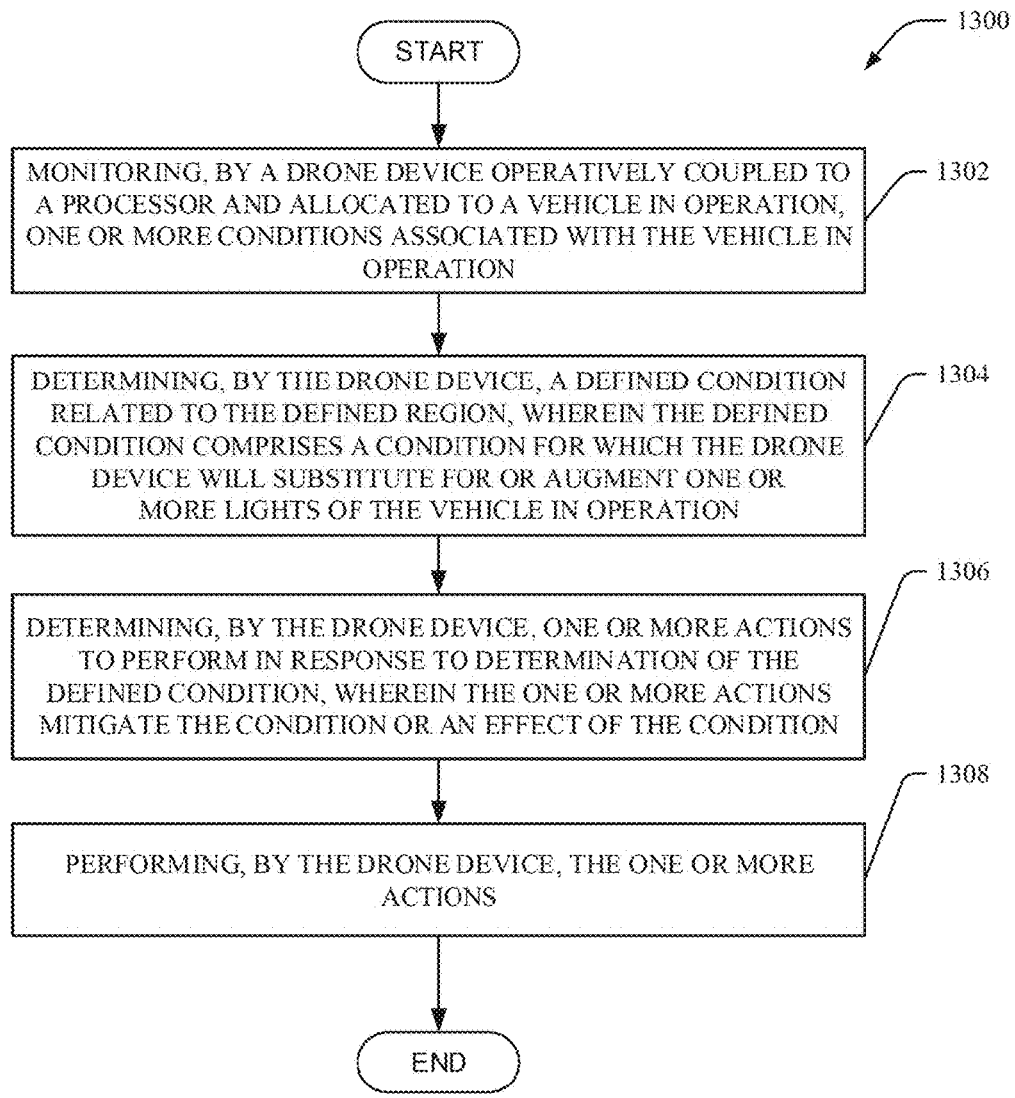
FIG. 13 illustrates a flow diagram of an example, non-limiting computer-implemented method that facilitates a drone device substituting for or augmenting a vehicle light in accordance with one or more embodiments described herein.

FIG. 13 illustrates a flow diagram of an example, non-limiting computer-implemented method 1300 that facilitates a drone device substituting for or augmenting a vehicle light in accordance with one or more embodiments described herein. Repetitive description of like elements employed in other embodiments described herein is omitted for sake of brevity.

At 1302, a defined region around a vehicle in operation is monitored (e.g., via drone device 502, a vehicle signaling component 504, and/or monitoring component 602). At 1304, a defined condition related to the defined region under which the drone devices is needed to substitute for or augment one or more lights of the vehicle in operation is determined (e.g., via drone device 502, a vehicle signaling component 504, and/or monitoring component 602). At 1306, one or more actions to perform to in response to the determined defined condition to mitigate the defined condition or an effect of the defined condition are determined (e.g., via drone device 502, a vehicle signaling component 504, monitoring component 602, response component 604, and/or indication component 606). At 1308, the one or more determined actions are performed (e.g., via drone device 502, a vehicle signaling component 504, monitoring component 602, response component 604, and/or indication component 606).

Figure 14:
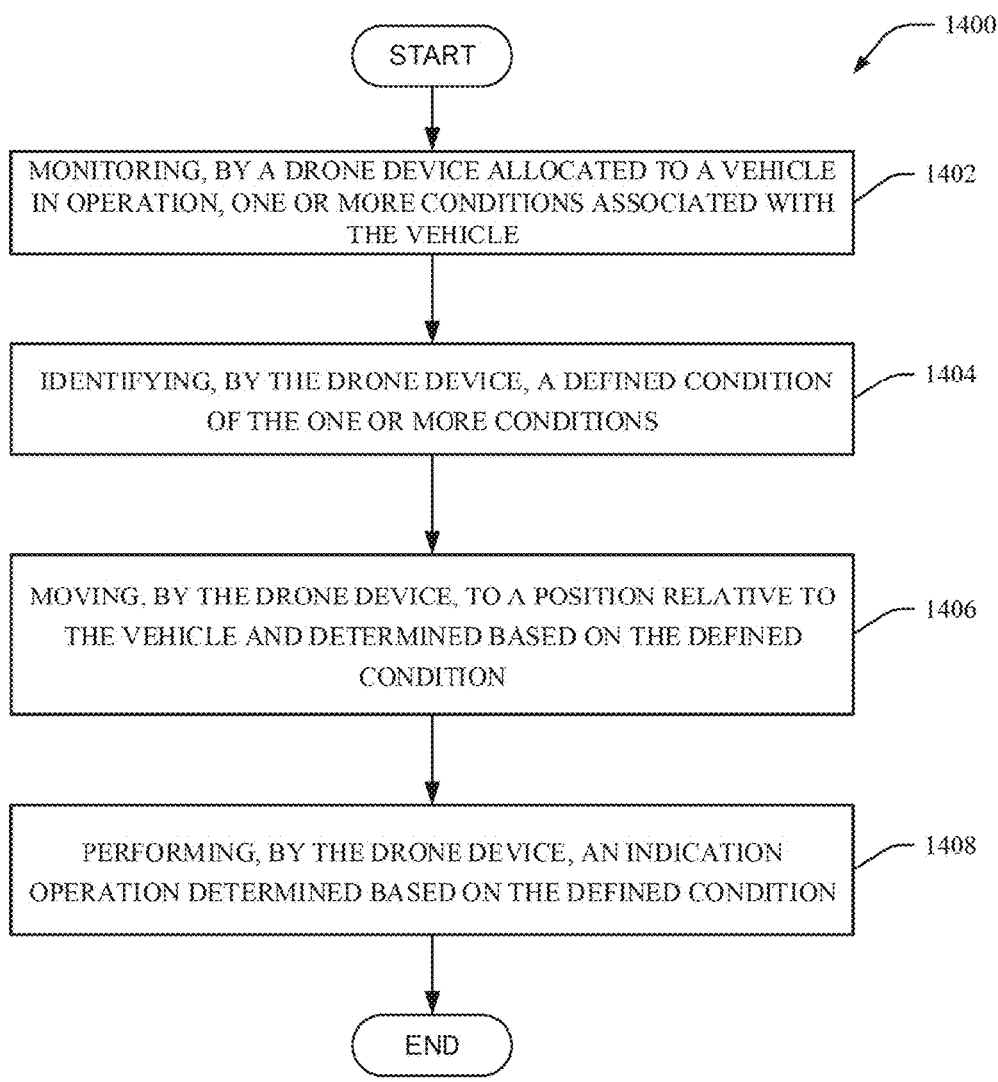
FIG. 14 illustrates a flow diagram of an example, non-limiting computer-implemented method that facilitates a drone device substituting for or augmenting a vehicle light in accordance with one or more embodiments described herein.

FIG. 14 illustrates a flow diagram of an example, non-limiting computer-implemented method 1400 that facilitates a drone device substituting for or augmenting a vehicle light in accordance with one or more embodiments described herein. Repetitive description of like elements employed in other embodiments described herein is omitted for sake of brevity.

At 1402, a defined region around a vehicle in operation is monitored (e.g., via drone device 502, a vehicle signaling component 504, and/or monitoring component 602). At 1404, a defined condition of the one or more conditions is identified (e.g., via drone device 502, a vehicle signaling component 504, and/or monitoring component 602). At 1406, the drone device is moved to a position relative to the vehicle determined based on the defined condition (e.g., via drone device 502, a vehicle signaling component 504, response component 604, and/or indication component 606). At 1408, the one or more determined actions are performed (e.g., via drone device 502, a vehicle signaling component 504, monitoring component 602, response component 604, and/or indication component 606). 1408, performing, by the drone device, an indication operation determined based on the defined condition (e.g., via drone device 502, a vehicle signaling component 504, response component 604, and/or indication component 606).

Figure 15:
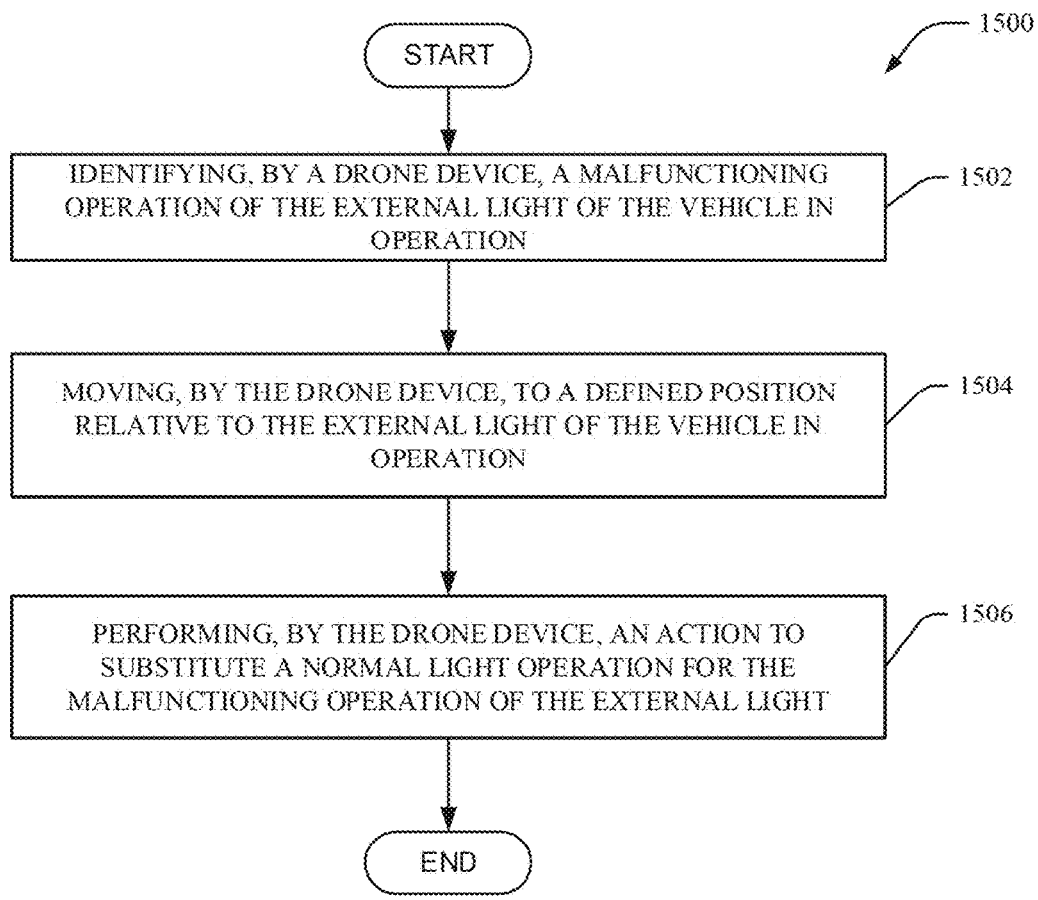
FIG. 15 illustrates a flow diagram of an example, non-limiting computer-implemented method that facilitates a drone device substituting for a malfunctioning operation of an external vehicle light in accordance with one or more embodiments described herein.

FIG. 15 illustrates a flow diagram of an example, non-limiting computer-implemented method 1500 that facilitates a drone device substituting for a malfunctioning operation of an external vehicle light in accordance with one or more embodiments described herein. Repetitive description of like elements employed in other embodiments described herein is omitted for sake of brevity.

At 1502, a malfunctioning operation of an external light of a vehicle in operation is identified. At 1504, the drone device is moved to a defined position relative to the external light of the vehicle in operation (e.g., via drone device 502, a vehicle signaling component 504, and/or monitoring component 602). At 1506, an action to substitute a normal light operation for the malfunctioning operation of the external light is performed (e.g., via drone device 502, a vehicle signaling component 504, monitoring component 602, response component 604, and/or indication component 606).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 16:
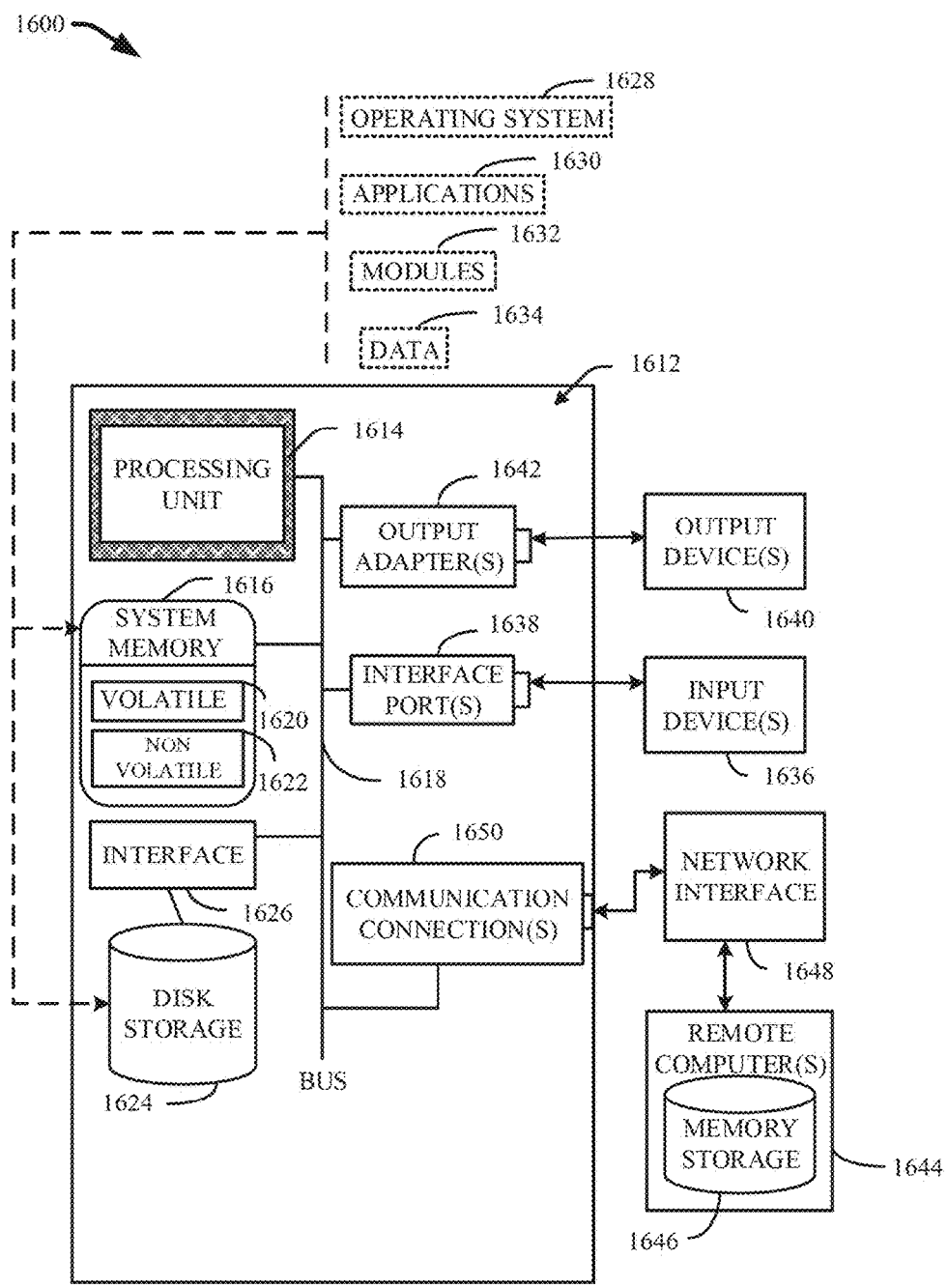
FIG. 16 illustrates a block diagram of an example, non-limiting operating environment in which one or more embodiments described herein can be facilitated.

In order to provide a context for the various aspects of the disclosed subject matter, FIG. 16 as well as the following discussion are intended to provide a general description of a suitable environment in which the various aspects of the disclosed subject matter can be implemented. FIG. 16 illustrates a block diagram of an example, non-limiting operating environment in which one or more embodiments described herein can be facilitated. Repetitive description of like elements employed in other embodiments described herein is omitted for sake of brevity. With reference to FIG. 16, a suitable operating environment 1600 for implementing various aspects of this disclosure can also include a computer 1612. The computer 1612 can also include a processing unit 1614, a system memory 1616, and a system bus 1618. The system bus 1618 couples system components including, but not limited to, the system memory 1616 to the processing unit 1614. The processing unit 1614 can be any of various available processors. Dual microprocessors and other multiprocessor architectures also can be employed as the processing unit 1614. The system bus 1618 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1694), and Small Computer Systems Interface (SCSI). The system memory 1616 can also include volatile memory 1620 and nonvolatile memory 1622. The basic input/output system (BIOS), containing the basic routines to transfer information between elements within the computer 1612, such as during start-up, is stored in nonvolatile memory 1622. By way of illustration, and not limitation, nonvolatile memory 1622 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1620 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1612 can also include removable/non-removable, volatile/non-volatile computer storage media. FIG. 16 illustrates, for example, a disk storage 1624. Disk storage 1624 can also include, but is not limited to, devices like a magnetic disk drive, floppy disk drive, tape drive, Jaz drive, Zip drive, LS-100 drive, flash memory card, or memory stick. The disk storage 1624 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1624 to the system bus 1618, a removable or non-removable interface is typically used, such as interface 1626. FIG. 16 also depicts software that acts as an intermediary between users and the basic computer resources described in the suitable operating environment 1601. Such software can also include, for example, an operating system 1628. Operating system 1628, which can be stored on disk storage 1624, acts to control and allocate resources of the computer 1612. System applications 1630 take advantage of the management of resources by operating system 1628 through program modules 1632 and program data 1634, e.g., stored either in system memory 1616 or on disk storage 1624. It is to be appreciated that this disclosure can be implemented with various operating systems or combinations of operating systems. A user enters commands or information into the computer 1612 through input device(s) 1636. Input devices 1636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1614 through the system bus 1618 via interface port(s) 1638. Interface port(s) 1638 include, for example, a serial port, a parallel port, a game port, and a universal serial bus (USB). Output device(s) 1640 use some of the same type of ports as input device(s) 1636. Thus, for example, a USB port can be used to provide input to computer 1612, and to output information from computer 1612 to an output device 1640. Output adapter 1642 is provided to illustrate that there are some output devices 1640 like monitors, speakers, and printers, among other output devices 1640, which require special adapters. The output adapters 1642 include, by way of illustration and not limitation, video and sound cards that provide a means of connection between the output device 1640 and the system bus 1618. It should be noted that other devices and/or systems of devices provide both input and output capabilities such as remote computer(s) 1644.

Computer 1612 can operate in a networked environment using logical connections to one or more remote computers, such as remote computer(s) 1644. The remote computer(s) 1644 can be a computer, a server, a router, a network PC, a workstation, a microprocessor based appliance, a peer device or other common network node and the like, and typically can also include many or all of the elements described relative to computer 1612. For purposes of brevity, only a memory storage device 1646 is illustrated with remote computer(s) 1644. Remote computer(s) 1644 is logically connected to computer 1612 through a network interface 1648 and then physically connected via communication connection 1650. Network interface 1648 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1650 refers to the hardware/software employed to connect the network interface 1648 to the system bus 1618. While communication connection 1650 is shown for illustrative clarity inside computer 1612, it can also be external to computer 1612. The hardware/software for connection to the network interface 1648 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A drone device, comprising:
   a memory that stores computer executable components; and
   a processor that executes the computer executable components stored in the memory, wherein the computer executable components comprise:
   a monitoring component that monitors one or more conditions associated with a vehicle; and
   a response component that, in response to identification of a defined condition of the one or more conditions:
   moves the drone device to a position relative to the vehicle and determined based on the defined condition, wherein the defined condition comprises a malfunction of an external turn indicator signal of the vehicle, and the position is a defined position relative to the external turn indicator signal; and
   initiates the drone device to perform an indication operation determined based on the defined condition, wherein the indication operation comprises an external turn signal indication of the vehicle.

2. The drone device of claim 1, wherein the indication operation comprises presentation of a visual indication.

3. The drone device of claim 1, wherein the indication operation comprises presentation of an audio indication.

4. The drone device of claim 1, wherein the indication operation comprises presentation of image data associated with the defined condition on a display device for the vehicle.

5. The drone device of claim 1, wherein the indication operation comprises provide an indication to a second vehicle located at a defined position relative to the vehicle.

6. The drone device of claim 1, wherein the monitoring is performed using a sensor device coupled to the drone device.

7. The drone device of claim 1, wherein the monitoring comprises receive condition information from the vehicle.

8. The drone device of claim 1, wherein the defined condition further comprises a malfunction of an external brake indicator signal of the vehicle, the defined position is also relative to the external brake indicator signal, and the indication operation further comprises an external brake indication signal of the vehicle.

9. The drone device of claim 1, wherein the drone device is docked on the vehicle.

10. The drone device of claim 1, wherein the defined condition further comprises a condition selected from a group consisting of a defined weather-related condition and a defined traffic-related condition.

11. A computer program product facilitating maintenance of a distance between a vehicle in operation and a second vehicle, the computer program product comprising a non-transitory computer readable medium having program instructions embodied therewith, the program instructions executable by a drone device to cause the drone device to:
    determine a defined region outside the vehicle and monitor the defined region for one or more conditions; and
    perform one or more actions to mitigate a condition of the one or more conditions in response to detection of the condition, where the condition comprises location of a second vehicle behind the vehicle, the one or more actions comprise:
    determine a distance behind the vehicle to maintain between the vehicle and the second vehicle; and
    fly in a defined pattern to indicate to the second vehicle to maintain at least the distance between the vehicle and the second vehicle.

12. The computer program product of claim 11, wherein the distance is based on a weather condition.

13. The computer program product of claim 12, wherein the distance is based on a determined braking capability of the second vehicle.

14. The computer program product of claim 12, wherein the distance is based on a determined road condition of a road along which the vehicle is traversing.

15. The computer program product of claim 12, wherein the distance is based on a determined level of visibility of an operator of the second vehicle of another defined region ahead of the second vehicle.

16. The computer program product of claim 12, wherein the defined pattern is relative to the vehicle and the second vehicle.

17. A computer-implemented method, comprising:
    identifying, by a drone device operatively coupled to a processor and allocated to a vehicle in operation, a malfunctioning operation of an external brake light of the vehicle in operation;
    moving, by the drone device, to a defined position relative to the external brake light of the vehicle in operation; and performing, by the drone device, an action to substitute a normal brake light indication operation for the malfunctioning operation of the external brake light.

18. The computer-implemented method of claim 17, wherein the normal brake light indication operation comprises a visual braking indication function of the external brake light.

19. The computer-implemented method of claim 17, further comprising performing, by the drone device, a second brake light indication operation that provides a visual indication of an activation of an anti-lock braking system of the vehicle in operation.

20. The computer-implemented method of claim 17, further comprising performing, by the drone device, a second brake light indication operation that provides a visual indication of black ice on a surface of a road on which the vehicle in operation is traversing.

* * * * *